(12) United States Patent
van de Laar et al.

(10) Patent No.: US 11,254,054 B2
(45) Date of Patent: Feb. 22, 2022

(54) EXPOSURE SYSTEMS, PRINTING SYSTEMS, METHODS FOR ADDITIVE MANUFACTURING, COMPOSITIONS, AND THE USE THEREOF

(71) Applicant: NTS Systems Development B.V., Eindhoven (NL)

(72) Inventors: Laurens van de Laar, Eindhoven (NL); Ranjana Chhaganbhai Baker, Little Hallingbury (GB)

(73) Assignee: NTS Systems Development B.V., Eindhoven (NL)

( * ) Notice: Subject to any disclaimer, the term of this patent is extended or adjusted under 35 U.S.C. 154(b) by 423 days.

(21) Appl. No.: 16/098,495

(22) PCT Filed: May 1, 2017

(86) PCT No.: PCT/NL2017/050276
§ 371 (c)(1),
(2) Date: Nov. 2, 2018

(87) PCT Pub. No.: WO2017/192033
PCT Pub. Date: Nov. 9, 2017

(65) Prior Publication Data
US 2019/0351615 A1 Nov. 21, 2019

(30) Foreign Application Priority Data
May 2, 2016 (NL) ...................... 2016716

(51) Int. Cl.
*B33Y 50/00* (2015.01)
*B33Y 50/02* (2015.01)
(Continued)

(52) U.S. Cl.
CPC .......... *B29C 64/282* (2017.08); *B29C 64/129* (2017.08); *B33Y 10/00* (2014.12); *B33Y 30/00* (2014.12); *B33Y 70/00* (2014.12); *C09D 11/101* (2013.01); *C09D 11/107* (2013.01); *C09D 11/38* (2013.01); *B29C 64/209* (2017.08); *B29C 64/245* (2017.08); *B29C 2035/0822* (2013.01); *B29C 2035/0827* (2013.01); *B29K 2033/04* (2013.01); *B29K 2105/0005* (2013.01)

(58) Field of Classification Search
CPC ..... B29C 64/124; B29C 64/129; B29C 64/20; B29C 64/209; B29C 64/245; B29C 64/264; B29C 64/277; B29C 64/282; B29C 64/386; B29C 64/393; B33Y 10/00; B33Y 30/00; B33Y 50/00; B33Y 50/02
USPC ....................... 264/401; 425/135, 174.4, 470
See application file for complete search history.

(56) References Cited

U.S. PATENT DOCUMENTS

| 6,410,942 B1 | 6/2002 | Thibeault et al. |
| 2009/0267269 A1 | 10/2009 | Lim et al. |

(Continued)

FOREIGN PATENT DOCUMENTS

EP 2226683 A1 9/2010

*Primary Examiner* — Leo B Tentoni
(74) *Attorney, Agent, or Firm* — Hoffmann & Baron, LLP

(57) ABSTRACT

Printing systems, compositions suitable for the printing system, use of the compositions, methods for additive manufacturing, and exposure systems, all allowing for improved 3D manufacturing of products, include the exposure of layers of photopolymer material by two different wavelengths coming from LEDs.

19 Claims, 9 Drawing Sheets

(51) Int. Cl.
    *B29C 64/282*     (2017.01)
    *B33Y 10/00*     (2015.01)
    *B33Y 30/00*     (2015.01)
    *B33Y 70/00*     (2020.01)
    *B29C 64/129*     (2017.01)
    *C09D 11/101*     (2014.01)
    *C09D 11/107*     (2014.01)
    *C09D 11/38*     (2014.01)
    *B29C 35/08*     (2006.01)
    *B29K 33/04*     (2006.01)
    *B29K 105/00*     (2006.01)
    *B29C 64/245*     (2017.01)
    *B29C 64/209*     (2017.01)

(56) References Cited

U.S. PATENT DOCUMENTS

| | | |
|---|---|---|
| 2013/0059411 A1 | 3/2013 | Gerard et al. |
| 2014/0265034 A1* | 9/2014 | Dudley .......... B33Y 30/00 264/401 |
| 2016/0067921 A1 | 3/2016 | Willis et al. |
| 2016/0115297 A1 | 4/2016 | Norikane et al. |

* cited by examiner

EXPOSURE SYSTEMS, PRINTING SYSTEMS, METHODS FOR ADDITIVE MANUFACTURING, COMPOSITIONS, AND THE USE THEREOF

CROSS-REFERENCE TO RELATED APPLICATIONS

This application is the National Stage of International Application No. PCT/NL2017/050276, filed May 1, 2017, which claims the benefit of Netherlands Application No. NL 2016716, filed May 2, 2016, the contents of which is incorporated by reference herein.

FIELD OF THE INVENTION

The invention relates to an exposure system, a printing system including an exposure system, a method for additive manufacturing, a composition and the use of a composition as a photopolymer material.

Generally speaking, the invention relates to digital printing in which digital-based images can be printed to a variety of media using for instance well-known laser or inkjet printers.

BACKGROUND OF THE INVENTION

Stereolithography, an example of a digital printing method in which an object is build up layer by layer using photopolymer materials, is used more and more in both graphics and industry and currently also finds its way to consumer areas.

Examples of printing systems using stereolithography include laser-based systems in a container with photopolymer material, where a coating device deposits a new layer of photopolymer material after each cured layer.

Another type of system uses one or more DLP (Digital Light Processing) or DMD (Digital Micromirror Device) modules to cure layers of photopolymer material. Here, often the light source is at the bottom exposing through a glass plate, and coating is done by pulling the object upward thereby (re)filling the gap between the object and the glass plate with photopolymer material. Alternatively, the DLP or DMD exposure light source can be above the photopolymer container and the light is focused on the top surface: coating is done by pulling the cured object downwards into the photopolymer such that a fresh photopolymer flows over and fills the surface.

This type of system can be made such that continuous exposure over a 2-dimensional area can be synchronized to the refilling of the surfaces being exposed.

Alternatively the 2-dimensional image can be deflected over a larger area and then the whole layer is recoated.

For large object building, the exposure system can comprise several modules of DMD which are arranged to present a seamlessly joined exposure over the larger photopolymer area.

Yet another system uses printheads to selectively deposit layers of photopolymer material, after which a scan with e.g. UV light cures the layer of photopolymer material. The jetting may by itself create a next layer directly on top of a previous layer or the jetting occurs on top of a powder bed.

However, a drawback of current printing systems is that the number of suitable materials for the photopolymer material is low and highly depends on the radiation source used to illuminate the photopolymers. For instance, LEDs provide significant advantages over e.g. laser sources, but the current acrylic photopolymer materials (e.g. to be used in stereolithography methods) suitable for LED exposure may lead to weak parts and suffer from significant shrinkage on curing resulting in warping effects. This is a problem especially when producing large objects. Further, the final cured material may be brittle resulting in a relatively high risk of shatter of the formed objects, or the material may not be properly cured resulting in the product being at least partially sticky or gel like as the components in the compositions have not cured properly.

A drawback of photopolymer materials specifically designed for laser-based systems is that the extent of curing right after exposure is not sufficient and the cured materials also may suffer from warp and shatter. Thus, for stereolithography applications, the use of many support structures is required during manufacturing of 3D structures with the laser-based system. After removal of support, there may still be a visible effect on the part. In addition, support structures require additional considerations of software complexity, data transmission rates and use of extra photopolymer material, resulting in a need for greater data transfer and uneconomic waste removal and disposal of the cured support parts.

US20160067921 discloses the use of 2 wavelengths in photo-polymer based 3D printers, for example first wavelength 460 nm and second wavelength 365 nm, where the first wavelength is to cause photo-inhibition in a whole layer and the second wavelength is to cause image-wise polymerisation.

US20160115297 discloses water based compositions where the compositions are jetted, followed by UV irradiation or thermal irradiation from lamps to cure a jetted hydrogel precursor.

SUMMARY OF THE INVENTION

It is an object of the invention to overcome one or more of the above described drawbacks, in particular to provide an improved photopolymer material, an improved printing system, an improved method for additive manufacturing, and an improved exposure system.

This object is achieved in a first aspect of the invention by a printing system comprising:
 a. an object holder configured to hold an object;
 b. a coating device for providing a layer of photopolymer material on the object holder or the object;
 c. an exposure system for illuminating the layer of photopolymer material;
 d. an actuator for moving the exposure system relative to the object holder in a scanning direction;
wherein the exposure system comprises a first lighting device to expose the layer of photopolymer material to radiation with a first wavelength,
wherein the exposure system comprises a second lighting device to expose the layer of photopolymer material to radiation with a second wavelength different from the first wavelength,
wherein the first lighting device comprises a first array of light sources,
wherein the light sources of the first array are individually addressable,
and wherein the first and second lighting device are arranged such that while moving the exposure system relative to the layer of photopolymer material in the scanning direction, an area on the layer of photopolymer material is first exposable to radiation with the first or second wavelength, and is subsequently exposable to radiation with the other one of the first and second wavelength.

An advantage of the printing system according to the first aspect is that the printing system can be used with a wide variety of photopolymer materials. It can be used for compositions having a sensitivity for the first wavelength, compositions having a sensitivity for the second wavelength, and compositions having a sensitivity for both the first and second wavelength.

In an embodiment, the second lighting device comprises a second array of light sources, wherein the light sources of the second array are individually addressable.

In an embodiment, the exposure system is configured to selectively illuminate the layer of photopolymer material.

The photopolymer compositions can be more precisely cured according to varying degrees of radiation being delivered at each addressable spot or area, both in wavelength and intensity of each wavelength, such that the curing characteristics of the photopolymer is precisely tuned.

In an embodiment, the printing system has an exposure system comprising 2-dimensional arrays, for example micro LED arrays or micro laser arrays, and these arrays are such that a 2-dimensional area of the composition is addressed by the exposure system. In an embodiment this exposure system may be configured, for example, for the exposure of an entire 2-dimensional layer of the photopolymer material at the same time. In another embodiment this exposure system may be configured for the exposure of only a section of an entire 2-dimensional layer at the same time, whereby the entire 2-dimensional layer for example may be exposed by a scanning movement of the exposure system over the entire 2-dimensional layer.

The light sources may be micro lasers or LEDs. The LEDs are preferably individually tuneable LEDs, and are preferably LEDs which include micro mirrors to direct the light from the LEDs to the photopolymer material. The micro lasers are preferably individually tuneable.

However, an exposure system using one or more light sources which are split into smaller light sources using for instance a Digital Mirror Device (DMD) as used in Digital Light Processing (DLP) is also considered to form an array or multiple arrays of light sources which light sources are individually addressable. LED and/or laser light sources may be used in conjunction with the DMD, where the DMD forms the multiple array of light sources from the said LED light source. Thus, light from two or more light sources, having different wavelengths, may be combined and focused onto the DMD.

In an embodiment, the first wavelength is in the UV or infrared range, and the second wavelength is in the other one of the UV or infrared range. This allows to use compositions according to a second or a third aspect of the invention as will be explained in more detail below to achieve a high cure, e.g. greater than 50%, preferably greater than 60% and more preferably greater than 70% shortly after exposure.

Preferably, the UV range includes wavelengths in the range of 200 nm-450 nm, more preferably the UV range includes wavelengths in the range of 250 nm-400 nm, and most preferably, the UV range includes wavelengths in the range of 250 nm-350 nm. A lower wavelength in the UV range may be preferred as it may provide the best energetics for polymerisation and chances are higher that the colour of the resin can be made neutral. For higher wavelengths, the process will still work, but the resin may turn yellow or orange, which may have an undesired aesthetic effect.

The term "wavelength" is used to mean that there will be a range of wavelengths centred at a given wavelength: the range maybe therefore more sharply defined, e.g. that obtained from micro lasers, or maybe broader e.g. from micro LED sources.

Preferably, the infrared range includes wavelengths in the range of 620 nm-1200 nm, more preferably, the infrared range includes wavelengths in the range of 650 nm-950 nm, and most preferably, the infrared range includes wavelengths in the range of 700 nm-950 nm. A higher wavelength in the infrared range may be preferred in order to achieve more neutral colours in the final digital cured product.

As referred below, the radiation absorbers, chosen to interact with the wavelengths, may be bleach-able during exposure or subsequently during any further treatment, so that a more neutral colour of the cured object is achieved.

In an embodiment, the light sources are individually tuneable. This allows to control the amount of radiation imparted to the substrate and can for instance be used to impart substantially equal amounts of radiation to each area of a substrate. Such capability may enable closer correlation of curing at each irradiated spot, pixel or voxel. On the other hand, this capability from the first and second sources, being individually tuneable, may be used to deliver differential radiation from each wavelength, as required for an individual voxel position, and this capability enables considerable flexibility in varying the cure properties in the photopolymers.

In an embodiment, the object holder is arranged stationary and the exposure system is moveable. In an alternative embodiment, the object holder is moveable and the exposure system is stationary. In yet another embodiment, both the object holder and the exposure system are moveable.

In an embodiment, the exposure system comprises a first moveable member including the first lighting device, and a second moveable member including the second lighting device, wherein the first and second moveable member are each separately driveable and controllable in order to move relative to the layer of photopolymer material.

In an embodiment, the distance between the first and second moveable members is tuneable to fit with timings required for the photopolymer materials used. For example, some photopolymer materials may respond better when the second exposure follows very shortly after the first, whereas other photopolymer materials may require a delay between the first and second exposures.

In an embodiment, the exposure system comprises a third lighting device to expose the layer of photopolymer material to radiation with the first wavelength, wherein the second lighting device is arranged in between the first and third lighting devices. In this way, independently of moving the exposure system in the positive or negative scanning direction relative to the photopolymer material, areas on the layer of photopolymer material are first exposable to radiation with the first wavelength and subsequently exposable to radiation with the second wavelength. It also allows to increase the radiation dose of radiation with the first wavelength. For instance, when the first wavelength is in the infrared range and the second wavelength is outside the infrared range, adding the third array allows to apply more thermal energy to the layer of photopolymer material.

In an embodiment, the third lighting device comprises a third array of light sources, wherein preferably, the second array of light sources is arranged in between the first and third array of light sources.

In an embodiment, the coating device is configured to selectively provide photopolymer material on the object holder or the object, in particular an inkjet printer.

In an embodiment, the coating device is configured to provide the photopolymer material by providing a first component of the photopolymer material as a powder layer and to selectively provide a second component of the photopolymer material, preferably by jetting the second component on the powder layer, such that the first and second component can be combined to form the photopolymer material.

In an embodiment, the first array of light sources extends in the scanning direction and a width direction perpendicular to the scanning direction, and wherein light sources of the first array at least partially overlap with at least two other light sources seen in the width direction.

In an embodiment, the exposure system is an exposure system according to the sixth aspect of the invention as described later-on.

In an embodiment, the first and second array of light sources are full width arrays, meaning that they cover the entire width of an exposable area of the photopolymer layer. Preferably, the first and second array of light sources allow to illuminate all areas of the exposable area of the photopolymer layer in a single pass.

According to a second aspect of the invention, there is provided a composition comprising:
a. b. 20, preferably 65, to 95 wt % of a liquid resin having a ring-opening functionality;
b. 0.1 to 10 wt % of a photoinitiator for the liquid resin having a ring-opening functionality;
c. 5 to 25 wt % of a liquid aliphatic, cycloaliphatic and/or aromatic acrylate;
d. 0.1 to 10 wt % of a radical photoinitiator for the liquid aliphatic, cycloaliphatic and/or aromatic acrylate; and
e. 0.1 to 10 wt % of an infrared absorber or sensitizer.

It will be clear to the skilled person that the sum of wt % of the components in the composition will not exceed 100 wt %, and in case the sum of wt % is below 100 wt %, the composition comprises one or more additives having a total wt % such that the sum of wt % is 100 wt %. For example, the additive or additives for achieving the sum wt % to 100% may be another polymerising additive such as a polyol, urethane acrylate, vinyl compound etc, and/or a filler, e.g. ceramics (e.g. silica) or nano particles etc.

An advantage of this composition is that it is sensitive to two different ranges of wavelengths, so that shortly after exposure the material is cured to a further extent than in the prior art, e.g. at least 50%, preferably at least 60%, more preferably at least 70%. Thus, the further curing at a site or area takes place after having been exposed to both ranges of wavelengths. Such curing at the required spot results in a higher quality of cured material both in polymerisation extent and depth control. The latter capability ensures sharp detail to be attained as polymer spread is controlled. Furthermore, when compared to e.g. laser scanning systems where there is a time differential between various areas of exposure and thus variability of cure extent, in the present case, the higher degree of cure ensures that exposed regions have reached more steady state cure and thus more consistent cure across the whole layer of exposure. Such greater extent of cure enables a stronger part being produced: the requirement of complex support structures for e.g. overhangs is thus reduced.

A liquid resin having a ring-opening functionality is in this specification defined by the IUPAC definition for ring-opening polymerization, Penczek S.; Moad, G. *Pure Appl. Chem.*, 2008, 80(10), 2163-2193: a polymerization in which a cyclic monomer yields a monomeric unit which is acyclic or contains fewer cycles than the monomer. Hence, if the monomer is polycyclic, the opening of a single ring is sufficient to classify the reaction as ring-opening polymerization.

In an embodiment, the ring-opening functionality is epoxy (3 membered ring), oxetane (4 membered ring), furan (5 membered ring) or pyran (6 membered ring), etc., or mixtures thereof. Preferably, the liquid resin and/or the acrylate have a multifunctionality, e.g. di-, tri-, or higher number of active polymerizing groups, e.g. the ring-opening functionality or the acrylate functionality.

Mixtures of compounds having mono, di, tri and/or higher functionality active polymerising groups may also be used.

In an embodiment, the composition further comprises at most 15 wt % of a liquid methacrylate having methacrylate functionality, wherein the total content of liquid aliphatic, cycloaliphatic and/or aromatic acrylate and liquid methacrylate is maximum 30, preferably 25 wt %, and wherein the radical photoinitiator is also for the liquid methacrylate. The methacrylate may be a multifunctional methacrylate, e.g. a di- or trimethacrylate.

The exposure regime of this application is useful for such methacrylate containing compounds, as the second wavelength exposure facilitates the higher curing requirements of such polymerisable additives. Usually in the previous exposure systems, such compounds were difficult to cure up.

In an embodiment, the composition further comprises 5 to 40 wt % of an OH-terminated or ester terminated compound, e.g. polyether, polyester, polyurethane, dihydropyrylium, dihydropyridine, etc.

In an embodiment, the composition further comprises 1 to 5 wt % of a leuco dye which becomes colored on being addressed by the first wavelength of the second wavelength or the combination of the first and second wavelength. A leuco dye is a dye whose molecules can acquire two forms, one of which is colorless. An example of a leuco dye is a crystal violet lactone, or leucoindigo.

The viscosity of the composition is preferably as low as possible, and may be in the range of 20 to 1500 cps, preferably in the range 25 to 1000 cps, more preferably in the range 25 to 700 cps. For stereolithography applications, the viscosity is preferably below 1000 cps.

For applications involving the jetting of the composition, the viscosity ranges are preferably in the range 20-80 cps, and such lower viscosity ranges may be achieved at higher temperatures, e.g. 40° C.-80° C., as required for the operation of the jetting mechanism, e.g. a piezo printhead.

Alternatively or additionally, such lower viscosities are obtained using reactive diluents, where in the present invention, the dual wavelength method of exposure may ensure better curing of such reactive diluents.

The composition may be a gel or paste, which preferably has shear or vibration or thermal thinning characteristics for easier deposition or coating. Such gel or pastes may be those containing higher levels of solid particles, such as silica, phosphors, mica, carbon, graphene flakes etc. By the term "thinning" is meant that the viscosity is lowered. The gels may, for example, be photo curable gels comprising water compositions of acrylics, such as urethane methacrylate and mono- and multi-functional (meth)acrylate, and photo initiators UV and/or IR.

The composition may comprise stabilisers to prevent premature curing of the composition before use. Such stabilisers are preferably used in weight amounts of 0.1 to 1%.

The infrared absorber or sensitizer may be a cyanine dye, oxonol dye, squarylium dye, indolene dye. In fact, any absorber that can interact with infrared radiation to create catalysts and/or thermal effects may be used.

In an embodiment, the chosen UV and/or infrared absorber is bleachable by irradiation, so that better, i.e. whiter or more transparent, colour is obtained in the final product. This bleaching of the absorber may occur during the irradiation, or subsequently during any post treatments, e.g. heating or overall exposure at a selective wavelength after the object has been formed. For example the object after washing and removal of any supports, may be exposed in a thermal chamber using electromagnetic radiation to bleach the uv absorber.

In an embodiment, the composition comprises 0.01 to 3 wt % of an additive, where the additive may be one or more of the following:
- solid particles, e.g. polymer particles, ceramics or metal which are dispersed in the composition, the particles preferably being in the size range of 0.1-2 microns;
- reactive diluents;
- cross linkers, such as diesters, diols and dihydropyridines;
- tougheners, such as polyols, polyester polyols, short chain polymers;
- flexibilisers;
- stabilisers, e.g. amines, phenols;
- nano metals, e.g. nano silver or nano copper to provide conductivity;
- nano graphene or nano carbon tubes to provide conductivity or strengthening effects;
- additives to provide optoelectronic effects, such as quantum dots, e.g. nano lead sulfide;
- additives to provide bioelectronics effects;
- other nano particles, either organic or metallic;
- surface modifiers;
- bubble breakers;
- dyes;
- pigments;
- fibres.

The additives may be provided to impart desired physical properties for e.g. layer recoating, curing, and/or for achieving final cure properties of strength, flexibility, durability, and/or specialist effects such as electrical conductivity, optoelectronic effects, optical effects, magnetic effects, etc.

In an embodiment, the reactive diluents may form up to 30% of the composition, preferably up to 25%, more preferably up to 20%.

In an embodiment, the particles, cross linkers, tougheners and flexibilisers may even form up to 10% of the composition.

Certain embodiments may have higher amount of the additive: for example there may be up to 50% of solid particles, such as ceramics, or polymer particles, or nano particles, which are dispersed in the composition.

According to a third aspect of the invention, there is further provided a composition comprising:
a. 75 to 98 wt % of a liquid acrylic resin, which is an aliphatic, cycloaliphatic or aromatic acrylate, or 65 to 98 wt % of a liquid photopolymer having a ring-opening functionality;
b. 0.1 to 10 wt % of a liquid resin comprising block copolymer segments; and
c. 0.1 to 5 wt % of a photoinitiator which has absorbance in the wavelength range of 250-850 nm.

It will be clear to the skilled person that the sum of wt % of the components in the composition will not exceed 100 wt %, and in case the sum of wt % is below 100 wt %, the composition comprises one or more additives having a total wt % such that the sum of wt % is 100 wt %. For example, the additive or additives for achieving the sum wt % to 100% may be another polymerising additive such as a polyol, urethane acrylate, vinyl compound etc, and/or a filler, ceramics, e.g. silica, or nano particles etc.

Mixtures of compounds having mono, di, tri and/or higher functionality active polymerisable groups may also be used.

An advantage of this composition is that the composition can be cured using a single exposure of UV or infrared radiation, wherein the block copolymer segments provide additional strengthening characteristics to the cured polymer.

In an embodiment, the photoinitiator is a radical or cationic photoinitiator.

In an embodiment, both UV and infrared photoinitiators and/or sensitisers are present in the composition containing the block co polymer segments. These compositions have the advantage that they are suited for LED address.

Therefore, in a further embodiment, the composition further comprises 0.1 to 10 wt % of an infrared absorber or sensitizer. The infrared absorber or sensitizer may be a cyanine dye, oxonol dye, squarylium dye, indolene dye. In fact, any absorber that can interacts with infrared radiation to create catalysts and/or thermal effects may be used.

Especially when two different wavelengths, (e.g. UV and infrared) are used to cure the polymer, it is believed that the thermal aspects of curing aids in the self-organising nano properties of the block copolymer regions within the curing polymer.

In an embodiment, the photoinitiator has absorbance in the wavelength range of 250 to 450 nm. The photoinitiator may comprise onium salts such as triaryl sulfonium salt, iodonium or borates.

In an embodiment, the liquid resin having the block copolymer segments has at least one polymerisable group, e.g. acrylic, or ring-opening and/or other functionalities which enable this resin to become part of the main polymerizing photopolymer. In such cases, the other functionalities are for instance hydroxy, amines, isocyanate, etc.

In an embodiment, the composition comprises 0.01 to 3 wt % of an additive, where the additive may be one or more of the following:
- solid particles, e.g. polymer particles, ceramics, or metal which are dispersed in the composition, the particles preferably being in the size range of 0.1-2 microns;
- reactive diluents;
- cross linkers, such as diesters, diols and dihydropyridines;
- tougheners, such as polyols, polyester polyols, short chain polymers;
- flexibilisers;
- stabilisers, e.g. amines, phenols;
- nano metals, e.g. nano silver or nano copper to provide conductivity;
- nano graphene or nano carbon tubes to provide conductivity or strengthening effects;
- additives to provide optoelectronic effects, such as quantum dots, e.g. nano lead sulfide;
- additives to provide bioelectronics effects;
- other nano particles, either organic or metallic;
- surface modifiers;
- bubble breakers;
- dyes;
- pigments;
- fibres.

The additives may be provided to impart desired physical properties for e.g. layer recoating, curing, and/or for achieving final cure properties of strength, flexibility, durability, and/or specialist effects such as electrical conductivity, optoelectronic effects, optical effects, magnetic effects, etc.

In an embodiment, the reactive diluents may form up to 30% of the composition, preferably up to 25%, more preferably up to 20%.

In an embodiment, the particles, cross linkers, tougheners and flexibilisers may even form up to 10% of the composition.

Certain embodiments may have higher amount of the additive: for example there may be up to 50% of solid particles such as ceramics, polymer particles, etc or nano particles, which are dispersed in the composition.

The viscosity of the composition is preferably as low as possible, and may be in the range of 20 to 1500 cps, preferably in the range 25 to 1000 cps, more preferably in the range 25 to 700 cps. For stereolithography applications, the viscosity is preferably below 1000 cps.

For applications involving jetting of the composition, the viscosity ranges are preferably in the range of 20-80 cps, and such lower viscosity ranges may be achieved at higher temperatures, e.g. 40° C.-80° C., as required for the operation of the jetting mechanism, e.g. a piezo printhead.

Alternatively or additionally, such lower viscosities are obtained using reactive diluents, where in the present invention, the dual wavelength method of exposure may ensure better curing of such reactive diluents.

The composition may be a gel or paste, which preferably has shear or vibration or thermal thinning characteristics for easier deposition or coating. Such gel or pastes may be those containing higher levels of solid particles, such as silica, phosphors, mica, carbon, graphene flakes etc. By the term "thinning" is meant that the viscosity is lowered. The gels may, for example, be photo curable gels comprising water compositions of acrylics, such as urethane methacrylate and mono- and multi-functional (meth)acrylate, and photo initiators UV and/or IR.

In an embodiment, the block copolymer segments are of
 the general formula B-(A)n as defined in US2013/ 059411A1, wherein:
n is a natural integer greater than or equal to 1, preferably from 1 to 8;
B represents an acrylic or methacrylic polymer block composed of a sequence of monomer units which may be polymerized by the radical route, the overall Tg of which is less than 0° C., wherein the average molar mass of the block B is preferably greater than 1000 g/mol, preferably greater than 5000 g/mol, and more preferably greater than 10000 g/mol,
A is an acrylic of methacrylic polymer block composed of a sequence of monomer units which may be polymerized by the radical route, the overall Tg of which is greater than 0° C., wherein the average molar mass of each block A preferably ranges from 1000 g/mol to 200000 g/mol, preferably from 2000 g/mol to 100000 g/mol, and more preferably from 5000 g/mol to 50000 g/mol,
block B represents at least 50 wt %, preferably 60 to 95 wt % of the block copolymer.

Further examples of suitable block co polymers are block co polymers having silicon-acrylic monomers so that the silicone separates out on curing, e.g. with infrared exposure.

For the compositions according to the second and third aspect that comprise a mixture of sensitizers, for radical and cationic cure, and a mixture of absorbers to cause the sensitizers to be effective, a UV sensitizer may be provided for acrylic cure and/or production of acid, while the infrared sensitizer or absorber may be provided for thermal or photothermal cure following the UV radiation. This provides significant advantages for the acid catalysed thermal cure of e.g. ring-opening compounds, such as epoxy, oxetane, furan, spiro, etc.

In an embodiment, the chosen UV and/or infrared absorber is bleachable by irradiation, so that better, i.e. whiter or more transparent, colour is obtained in the final product. This bleaching of the absorber may occur during the irradiation, or subsequently during any post treatments, e.g. heating or overall exposure at a selective wavelength after the object has been formed. For example the object after washing and removal of any supports, maybe exposed in a thermal chamber using electromagnetic radiation to bleach the uv absorber.

In an embodiment, the composition further comprises 1 to 5 wt % of a leuco dye which becomes coloured on being addressed by the first wavelength of the second wavelength or the combination of the first and second wavelength. A leuco dye is a dye whose molecules can acquire two forms, one of which is colourless. An example of a leuco dye is a crystal violet lactone, or leuco indigo.

According to a fourth aspect of the invention, there is also provided the use of a composition according to the second or third aspect of the invention in manufacturing photopolymerized layers, e.g. in printing plates, optoelectronics, ceramics (e.g. tiles) or 3D additive object manufacturing.

In an embodiment, the composition is first exposed to UV radiation and subsequently exposed to infrared radiation. However, an embodiment in which the composition is first exposed to infrared radiation and subsequently exposed to UV radiation is also envisaged.

In an another embodiment, the composition is exposed to both the first and second radiation/wavelengths and/or other wavelengths, at the same time at the same position on the composition.

The composition maybe thus applied in sequence before each exposure as per an embodiment of the first aspect or simultaneously applied, synchronised with the exposure as per an embodiment of the ninth aspect of the invention.

In an embodiment, the composition is applied to a substrate before being exposed, wherein the substrate may be a moving web, such as a poly olefin film, a metal substrate, paper, textile or previously cured layer of material comprising the composition.

In an embodiment, the curable composition is split into two separate components, wherein one of the two components is provided in the form of a powder layer, such as organic or organometallic polymers (e.g. polymethacrylates, polyvinylbutyrals, polyamides, etc.), ceramics (e.g. silica or silicon oxicarbide), metals, and the other one of the two components is provided, e.g. jetted, onto the powder layer, such that at these areas the composition according to the second or third aspect of the invention is formed to be exposed and cured by the UV and/or infrared radiation. In an embodiment, the hard solid particles, such as metals or ceramics, may be coated with polymers which are capable of being infiltrated by the composition.

The powder is preferably infiltrated by the provided resin, at a rate such that the powder particles within the area of the provided component are integrated with the resin and this composite of powder and resin cures upon the sequential UV and infrared irradiation. The layer can subsequently be recoated with fresh powder layer, onto which further jetted zones are produced and cured by UV and/or infrared irradiation.

This process has the particular advantage that the infiltration/curing is located at the required digital area, and the whole layer is not (thermally) effected. This localised imaging/curing mechanism enables rapid consolidation/curing of the imaged area only and retrieval of the final product from the powder bed: for comparison, laser sintering requires excessive wait times as the powder cools down and the formed product is retrieved.

In an embodiment, the composition is used in other aspects of the invention. For instance in the various printing systems according to the invention, which may provide control over both composition extent cure and (volume) depth cure.

According to a fifth aspect of the invention, there is further provided a method for additive manufacturing, said method comprising the following steps:
 a. providing a first layer of photopolymer material sensitive to both radiation with a first wavelength and radiation with a second wavelength different from the first wavelength;
 b. providing a first pattern corresponding to to be cured areas in the first layer;
 c. at least partially exposing the to be cured areas in the first layer to radiation with the first wavelength;
 d. at least partially exposing the to be cured areas to radiation with the second wavelength, wherein the areas exposed to radiation with the second wavelength also have been exposed to radiation with the first wavelength.

The steps a, b, c, d can occur sequentially, for example, as per an embodiment of the first aspect or at the same time, for example, as per an embodiment of the ninth aspect, or in any other suitable order.

In an embodiment, the method further comprises the following steps:
 e. providing a second layer of photopolymer material sensitive to both radiation with the first wavelength and radiation with the second wavelength next to the first layer;
 f. providing a second pattern corresponding to to be cured areas in the second layer;
 g. at least partially exposing the to be cured areas in the second layer to radiation with the first wavelength, wherein the exposed areas in the second layer at least correspond to to be cured areas in the first layer that have not previously been exposed to radiation with the second wavelength;
 h. at least partially exposing the to be cured areas in the second layer to radiation with the second wavelength, wherein the exposed areas in the second layer at least correspond to to be cured areas in the first layer that have not previously been exposed to radiation with the second wavelength.

The steps e, f, g, h can occur sequentially, for example as per an embodiment of the first aspect or at the same time, for example, as per an embodiment of the ninth aspect, or in any other suitable order.

In an embodiment, to be cured areas in the first layer that are not exposed to radiation with the first wavelength in step c. are selected on the basis of the second pattern such that in step g. the exposed areas in the second layer at least correspond to to be cured areas in the first layer that have not previously been exposed to radiation with the first wavelength. Preferably, the exposed areas in the second layer that correspond to to be cured areas in the first layer that have not previously been exposed to radiation with the first wavelength receive a higher radiation dose of radiation with the first wavelength than exposed areas in the second layer that correspond to to be cured areas in the first layer that have previously been exposed to radiation with the first wavelength.

In an embodiment, all to be cured areas in the respective layer are exposed to radiation with the first wavelength in step c. and g., and not all to be cured areas in the respective layer are exposed to radiation with the second wavelength in step d. and h.

In an embodiment, the exposed areas in the second layer that correspond to to be cured areas in the first layer that have not previously been exposed to radiation with the second wavelength receive a higher radiation dose of radiation with the second wavelength than exposed areas in the second layer that correspond to to be cured areas in the first layer that have previously been exposed to radiation with the second wavelength.

According to a sixth aspect of the invention, there is provided an exposure system for selectively illuminating a layer of photopolymer material, comprising:
 a. a first lighting device with a first array of light sources to expose the layer of photopolymer material to radiation with a first wavelength;
 b. a second lighting device to expose the layer of photopolymer material to radiation with a second wavelength;
wherein the light sources of the first array are individually addressable,
and wherein the first and second lighting devices are arranged such that while moving the exposure system relative to the layer of photopolymer material in a scanning direction, an area on the layer of photopolymer material is first exposable to radiation with the first or second wavelength, and is subsequently exposable to radiation with the other one of the first and second wavelength.

Many variations of imaging are thus possible, depending on the combination of curing extent and depth required. It may further be possible to vary the material properties at different locations, such that specially strengthened hard or highly flexible polymers are formed according to the final performance required in the final product.

In an embodiment, the second lighting device comprises a second array of light sources, wherein the light sources of the second array are individually addressable.

The light sources may be micro lasers or LEDs. The LEDs are preferably individually tuneable LEDs, and are preferably LEDs which include micro mirrors to direct the light from the LEDs to the photopolymer material. The micro lasers are preferably individually tuneable micro lasers.

However, an exposure system using one or more light sources which are split into smaller light sources using for instance a Digital Mirror Device (DMD) as used in Digital Light Processing (DLP) is also considered to form an array or multiple arrays of light sources which light sources are individually addressable. LED or laser light sources may be used in conjunction with the DMD, where the DMD forms the multiple array of light sources from the said LED light source. Thus, light from two or more light sources, having different wavelengths, may be combined and focused onto the DMD.

In an embodiment, the first wavelength is in the UV or infrared range, and the second wavelength is in the other one of the UV or infrared range. This allows to use compositions according to a second or a third aspect of the invention as will be explained in more detail below to achieve a high cure, e.g. greater than 50%, preferably greater than 60% and more preferably greater than 70% shortly after exposure.

Preferably, the UV range includes wavelengths in the range of 200 nm-450 nm, more preferably the UV range includes wavelengths in the range of 250 nm-400 nm, and most preferably, the UV range includes wavelengths in the range of 250 nm-350 nm. A lower wavelength in the UV range may be preferred as it provides the best energetics for polymerisation and chances are higher that the colour of the resin can be made neutral. For higher wavelengths, the process will still work, but the resin may turn yellow or orange, which may have an undesired aesthetic effect.

Preferably, the infrared range includes wavelengths in the range of 620 nm-1200 nm, more preferably, the infrared range includes wavelengths in the range of 650 nm-950 nm, and most preferably, the infrared range includes wavelengths in the range of 700 nm-950 nm. A higher wavelength in the infrared range may be preferred in order to achieve more neutral colours in the final digital cured product.

In an embodiment, the light sources are individually tuneable. This allows to control the amount of radiation imparted to the substrate and can for instance be used to impart substantially equal amounts of radiation to each area of a substrate. Such capability enables closer correlation of curing at each irradiated spot, pixel or voxel. On the other hand, this capability of combining the exposure, with individual tune-ability of the first and second sources, may be used to deliver differential radiation, as required for an individual voxel position, and this capability enables considerable flexibility in varying the cure properties in the photopolymers.

In an embodiment, the exposure system comprises a first moveable member including the first lighting device, and a second moveable member including the second lighting device, wherein the first and second moveable member are each separately driveable and controllable in order to move relative to the layer of photopolymer material.

In an embodiment, the distance between the first and second moveable members is tuneable to fit with timings required for the photopolymer materials used. For example, some photopolymer materials may respond better when the second exposure follows very shortly after the first, whereas other photopolymer materials may require a delay between the first and second exposures.

In an embodiment, the exposure system comprises a third lighting device to expose the layer of photopolymer material to radiation with the first wavelength, wherein the second lighting device is arranged in between the first and third lighting devices. In this way, independently of moving the exposure system in the positive or negative scanning direction relative to the photopolymer material, areas on the layer of photopolymer material are first exposable to radiation with the first wavelength and subsequently exposable to radiation with the second wavelength. It also allows to increase the radiation dose of radiation with the first wavelength. For instance, when the first wavelength is in the infrared range and the second wavelength is outside the infrared range, adding the third array allows to apply more thermal energy to the layer of photopolymer material.

In an embodiment, the third lighting device comprises a third array of light sources, wherein preferably, the second array of light sources is arranged in between the first and third array of light sources.

In an embodiment, the first and second array of light sources are full width arrays, meaning that they cover the entire width of an exposable area of the photopolymer layer. Preferably, the first and second array of light sources allow to illuminate all areas of the exposable area of the photopolymer layer in a single pass.

According to a seventh aspect of the invention, there is provided a printing system comprising:
a. an object holder configured to hold an object;
b. a device for providing photopolymer material on the object holder or the object; and
c. an exposure system for illuminating the photopolymer material;

wherein the exposure system comprises a first light source to expose the photopolymer material to radiation with a first wavelength, and the exposure system comprises a second light source to expose the photopolymer material to radiation with a second wavelength other than the first wavelength.

The device for providing photopolymer material on the object holder or the object can be any device/mechanism/means to provide photopolymer material on the object holder or the object, for example by dipping the object or object holder into a vat of liquid photopolymer, by delivery from a refilling coating device with blades, via an inkjet device, by movement of an actuator arranged to pull the object holder or the object out of a vat with liquid photopolymer, by movement of an actuator arranged to move the object holder or the object into a vat with liquid photopolymer, or by transfer of a liquid or gel photopolymer layer from a carrier substrate.

In an embodiment, the first wavelength is in the UV range or in the infrared range.

In an embodiment, the second wavelength is in the UV range or in the infrared range.

In an embodiment, the first wavelength is in the UV range and the second wavelength is in the infrared range. Alternatively, the first wavelength is in the infrared range and the second wavelength is in the UV range.

In an embodiment, each of the first wavelength and the second wavelength is selected to trigger polymerization of the photopolymer material.

In an embodiment, the first light source and/or the second light source when applicable comprise LEDs, preferably individually tuneable LEDs, preferably LEDs including micro mirrors to direct light from the LEDs to the photopolymer material.

In an embodiment, the printing system has an exposure system comprising 2-dimensional arrays, for example micro LED arrays or micro laser arrays, and these arrays are such that a 2-dimensional area of the composition is addressed by the exposure system. In an embodiment this exposure system may be configured, for example, for the exposure of an entire 2-dimensional layer of the photopolymer material at the same time. In another embodiment this exposure system may be configured for the exposure of only a section of an entire 2-dimensional layer at the same time, whereby the entire 2-dimensional layer for example may be exposed by a scanning movement of the exposure system over the entire 2-dimensional layer.

In an embodiment, the device for providing photopolymer material on the object holder or the object comprises an inkjet printer. The inkjet printer can be used as the only device to provide photopolymer material, but also to provide a second material, for example a second photopolymer material, or a component of a photopolymer material.

In an embodiment, the device for providing photopolymer material on the object holder or the object comprises a coating apparatus configured to provide a layer of first material on the object holder or the object, and an inkjet printer to selectively provide a second material to the layer of first material, wherein the combination of the first and second material forms the photopolymer material. The inkjet printer can also provide a further material, i.e. third, fourth, etc. For example, the combination of a first and a third material may form the photopolymer material.

According to an eighth aspect of the invention, there is provided a printing system comprising:
a. an object holder configured to hold an object;
b. a device for providing photopolymer material on the object holder or the object;
c. an exposure system for illuminating the photopolymer material; and
d. an actuator for moving the exposure system relative to the object holder in a scanning direction,
wherein the exposure system comprises an array of light sources to expose the photopolymer material to radiation with a first wavelength, wherein the array extends in the scanning direction and a width direction perpendicular to the scanning direction, and wherein the light sources at least partially overlap with at least two other light sources seen in the width direction.

The device for providing photopolymer material on the object holder or the object can be any device/mechanism/means to provide photopolymer material on the object holder or the object, for example by dipping the object or object holder into a vat of liquid photopolymer, by delivery from a refilling coating device with blades, via an inkjet device, by movement of an actuator arranged to pull the object holder or the object out of a vat with liquid photopolymer, by movement of an actuator arranged to move the object holder or the object into a vat with liquid photopolymer, or by transfer of a liquid or gel photopolymer layer from a carrier substrate.

In an embodiment, the light sources are LEDs, preferably micro LEDs, more preferably LEDs including micro mirrors to direct light from the LEDs to the photopolymer material.

In an embodiment, the device for providing photopolymer material on the object holder or the object comprises an inkjet printer.

In an embodiment, a collimator is provided for each light source to collimate light emitted by the light source. The more collimated light beam created by the collimator may provide a larger depth of field and working distance for the exposure system. The collimator may be a dome shaped lens element arranged on each light source.

The collimator may be provided within an integrated optical element arranged on each light source.

In an embodiment, the exposure system comprises an optical filter.

In an embodiment, the exposure system comprises a blocking element configured to block light emitted by a light source at angles above a predetermined threshold angle with respect to a main direction of the light. Preferably, the blocking element is configured to block light above 20 degrees, more preferably to block light above 10 degrees deviation with respect to a main direction of the light. By blocking of light having an angle that deviates from the main direction of the light above the predetermined threshold angle, a more collimated light beam may be provided.

The optical filter and/or the blocking element may be arranged with or without a collimator in an integrated optical element arranged on each light source.

In an embodiment, the exposure system comprises a lens for each array of light sources to focus light emitted by the array of light sources. The lens may be provided as a simple lens or a compound of lenses.

In an embodiment, the lens is placed near the array of light sources. The footprint of the array of light sources, including an associated driver, may be larger than the lighting surface of the array of light sources. By providing the lens this ratio may be advantageously be adjusted to relatively enlarge the image surface of the light sources and to therewith decrease the number of rows needed in the array of light sources. The placement near the lens may also be used to increase depth of field and/or the working distance.

In an embodiment, the printing system comprises a light intensity sensor system arranged to measure the light intensity of the individual light sources. The light intensity sensor system may for example comprise an on-board sensor or a sensor to be mounted before usage, that can measure the intensity of the individual light sources in the exposure system. The light intensity sensor system may for example comprise a camera, preferably a line camera, that is arranged to step or scan over the length of the exposure system, The measured light intensity can for example be used to tune power of the light sources individually. This individual tuning of power of the lenses may for instance be used to correct for a failing LED or to achieve light uniformity, for instance caused by distortion and/or differences in light intensity of different light sources. The measured light intensities of the individual light sources may also be used to mechanically adjust the position of the arrays of light sources relative to each other.

In an embodiment, the light sources at least partially overlap with at least 3, 4, 5, 6, 7, 8, 9 or 10 other light sources seen in the width direction.

In an embodiment, the light sources are arranged in rows and columns extending perpendicular to each other, wherein the rows extend in a direction making an acute angle with the width direction.

In an embodiment, the light sources are arranged in rows extending parallel to the width direction, wherein a smallest distance between rows seen in the width direction is smaller than a dimension of the light sources seen in the width direction.

In an embodiment, the smallest distance between rows seen in the width direction is below 25% of the dimension of the light sources seen in the width direction, preferably at most 5 µm.

In an embodiment, the number of rows is larger than N, with N being a positive integer determined by the rounded up ratio between a transverse pitch of the light sources in a row and the smallest distance between rows.

In an embodiment, the number of rows above N is at least the rounded up value of $N*ds*\sin(\alpha)$, where ds is a scanning pitch between adjacent rows in the scanning direction, and where $\alpha$ is a predetermined maximum rotational error angle after assembly.

In an embodiment, the number of rows is determined by a multiple of the sum of N and the rounded up value of $N*ds*\sin(\alpha)/SH$.

In an embodiment, the light sources are solid-state light sources. For example such as described in U.S. Pat. No. 6,410,942.

In an embodiment, the light sources are tunable with respect to a light intensity emitted by the light sources.

In such embodiment, the light sources are configured to provide an increased light intensity at the moment of turning the light sources on and/or at the moment of turning the light sources off. Some types of light sources, for example LED's cannot run all the time with maximum or near maximum light intensity, because they would heat up too much. However, maximum or near maximum light intensity for a short period of time is possible. At the same time at the object surface area where a light source is just turned on or just turned off, not the entire object surface area will be scanned. And as a result, the received amount of light by this object surface area will be less. By applying an increase in the light intensity during turning on and/or turning off of the light sources, this decreased amount of light received by the object surface area can be compensated. This increased light intensity will therefore have a positive effect on the cure level of the edges of the object.

The increase in the light intensity may for example be at least 1.5 times, for instance about 2 times a nominal light intensity used by the light sources during curing of the photopolymer material.

In another embodiment, the light sources are configured to provide an increased light intensity when the light sources contribute to the curing of an edge of an object to be cured, in particular an edge of this object running substantially in the scanning direction of the exposure system. In other words the light intensity of a light source contributing to the curing of an edge of the object to be cured may temporarily be increased to a higher level. A light source may be considered to contribute to the curing of an edge of the object when its projected image has a distance of less than the diameter of the projected image away from this edge of the object, in the non-scanning direction. The increased intensity of the respective light source will also have a positive effect on the cure level of the edges of the object.

The increase in the light intensity may for example be at least 1.5 times, for instance about 2 times a nominal light intensity used by the light sources during curing of the photopolymer material in a part of the object not close to an edge.

It is remarked that, in practice, it may only be possible to increase the light intensity to the increased level for a short period of time in order to avoid overheating of the respective light sources In an embodiment, individually addressing and/or tuning of light sources is used to apply corrections to the projected image on fresh photopolymer material, based on a a height map determined by measurement of the object or object holder surface. For example, this could be done with a stereovision camera system. A correction can be the application of a higher light intensity, for example higher LED power, where the measured point on the object or object holder is below the nominal level. A correction can be the application of a lower light intensity, for example lower LED power or no power, where the measured point on the object or object holder is above the nominal level.

According to a ninth aspect of the invention, there is provided a printing system comprising:
 a. an object holder configured to hold an object;
 b. a device for providing photopolymer material on the object holder or object;
 c. an exposure system for illuminating the photopolymer material;
 d. an actuator for moving the object holder relative to the exposure system;
wherein the exposure system comprises a lighting device having light sources to expose the layer of photopolymer material to radiation with a first wavelength and a second wavelength, wherein the light sources are individually addressable.

The device for providing photopolymer material on the object holder or the object can be any device/mechanism/means to provide photopolymer material on the object holder or the object, for example by dipping the object or object holder into a vat of liquid photopolymer, by delivery from a refilling coating device with blades, via an inkjet device, by movement of an actuator arranged to pull the object holder or the object out of a vat with liquid photopolymer, by movement of an actuator arranged to move the object holder or the object into a vat with liquid photopolymer, or by transfer of a liquid or gel photopolymer layer from a carrier substrate.

In an embodiment, the photopolymer material is delivered from within a vat holding the photopolymer material.

In an embodiment, while moving the object holder, the photopolymer material is continuously delivered to the surface of the object and the photopolymer material is continuously exposable to radiation with the first and second wavelength.

In an embodiment, the radiation from first and second wavelengths are individually addressable and can be of differing intensity at the photopolymer material.

In an embodiment, there is synchronised relevant digital data to move the object holder and to activate the light sources in a continuous co-operative mode.

In an embodiment, the exposure system comprises a light source to expose the photopolymer material to radiation with a third wavelength.

In an embodiment, the first wavelength is in the UV range or in the infrared range, wherein the second wavelength is in the other one of the UV and infrared range, and wherein the UV range includes wavelengths in the range of 200 nm-450 nm and the infrared range includes wavelengths in the range of 620 nm-1200 nm.

In an embodiment, each of the first wavelength and the second wavelength is selected to trigger polymerization.

In an embodiment, the light sources are individually addressable.

In an embodiment, the light sources are individually tunable.

In an embodiment, the light sources are LEDs, preferably LEDs including micro mirrors to direct light from the LEDs to the photopolymer material.

In an embodiment, the device for providing photopolymer material on the object holder or the object comprises a coating device, preferably comprising an inkjet printer. The inkjet printer can be used as the only device to provide photopolymer material, but also to provide a second material, for example a second photopolymer material, or a component of a photopolymer material.

In an embodiment, the device for providing photopolymer material on the object holder or object is arranged to move the object holder and/or an object supported on the object holder in a container filled with liquid photopolymer material to allow flow of liquid photopolymer material on an object surface being cured.

In an embodiment, all light sources are arranged such that while moving the photopolymer material, an area on the fresh photopolymer material is exposable to radiation with one or both of the first wavelength and the second wavelength and/or the third wavelength. This may provide a seamless curing occurring in the photopolymer, while there is seamless delivery of the digital data, and the 3-dimensional object grows seamlessly.

In an embodiment, the actuator moving the object holder and digital data sent to the light sources is synchronized in a continuous co-operative mode, preferably in such a way that seamless curing occurs in the photopolymer while there is seamless delivery of the digital data.

It is to be noted that, where applicable, two or more aspects of the invention may be combined. Hence, features of one aspect of the invention, where possible may also apply to other aspects of the inventions. To give an example, when the exposure system of the sixth aspect of the invention is used in a printing system according to the first aspect of the invention, the features of the exposure system, whether described in relation to the first or the sixth aspect of the invention, may apply to this combination when feasible. Another example is that the block copolymer segments of the third aspect of the invention may also be used in the composition according to the second aspect of the invention.

BRIEF DESCRIPTION OF THE DRAWINGS

The invention will now be described in a non-limiting way by reference to the accompanying drawings in which like parts are indicated by like reference symbols, and in which.

DETAILED DESCRIPTION OF THE INVENTION

Figure 1:
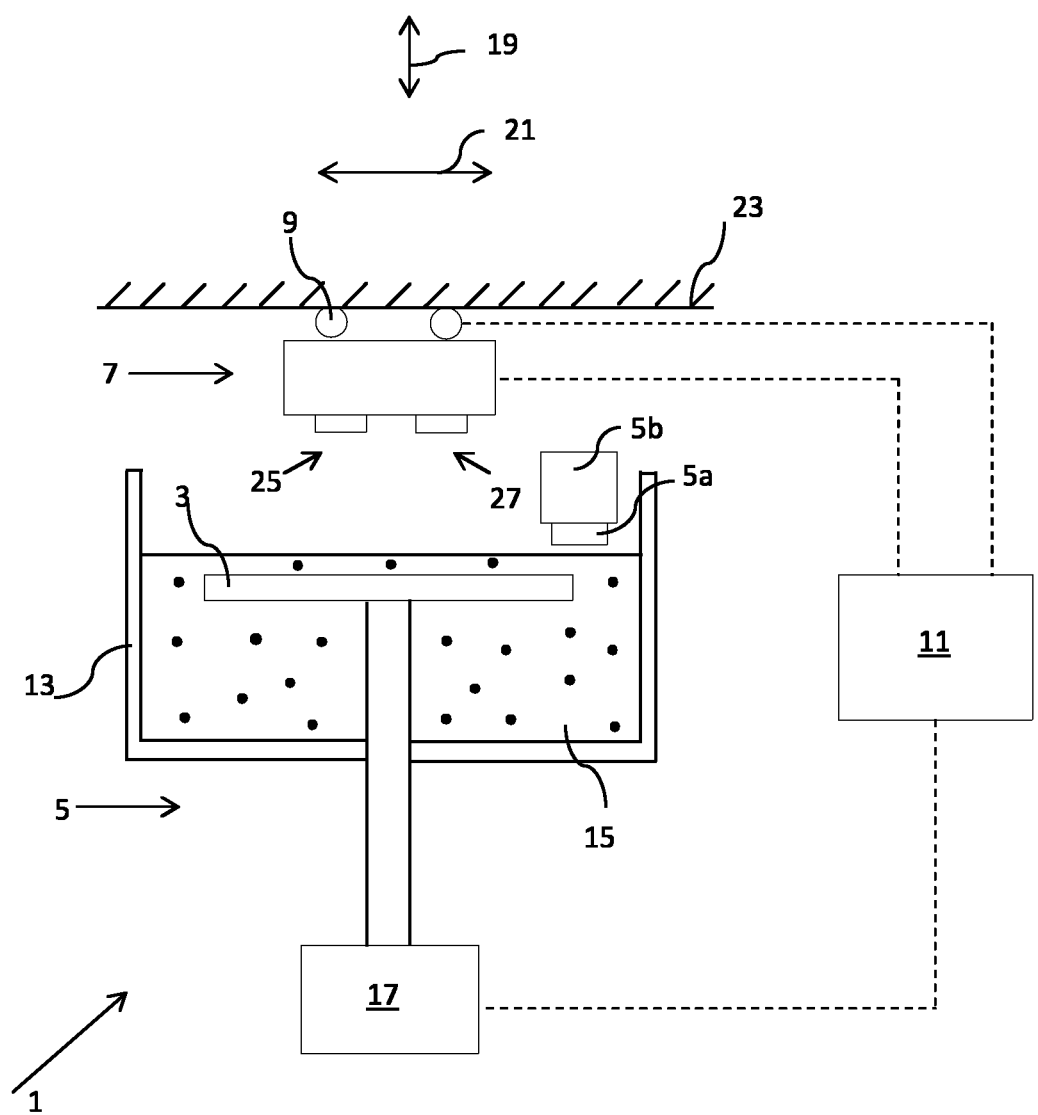
FIG. 1 schematically depicts a printing system according to an embodiment of the first and ninth aspect of the invention.

FIG. 1 schematically depicts a printing system 1 according to an embodiment of the invention, comprising an object holder 3, a coating device 5, an exposure system 7, an actuator 9, and a control unit 11.

The printing system 1 in this embodiment is configured to form an object layer by layer using photopolymer materials.

The object holder 3 is configured to hold an object (not shown) to be formed. In this embodiment, the object holder 3 may simply be a platform supporting the object to be formed, while in another embodiment, the object may be suspended from an object holder to allow the object to be pulled upward from a glass plate in order to provide photopolymer material in between the object and the glass plate to form a subsequent layer of the object. It is to be noted that the glass plate can also be considered to be part of the object holder as it supports the object as well after curing of the layer of photopolymer material.

The object holder 3 may comprise holes or is porous.

The coating device 5 is configured to provide a layer of photopolymer material on the object holder or the formed object itself and includes in this embodiment a container 13 filled with liquid photopolymer material 15, and a object holder actuator 17 connected to object holder 3 to move the object holder relative to the exposure system 7. After exposing a layer of photopolymer material to radiation, a new layer of uncured photopolymer material can be provided on top of the formed object by pulling the object holder 3 downwards in a direction 19 into the container 13 over a distance equal to the desired thickness of the layer of photopolymer material. Alternatively or additionally, photopolymer material may be added to the container 13 to refresh the photopolymer material on the object holder or the formed object itself.

It may be difficult to pump the photopolymer material to provide a layer of photopolymer material, in which case the principle of communicating vessels may be used to transfer photopolymer material to the vessel comprising the object holder and/or object.

As indicated above for the other embodiment with a glass plate, the coating device may alternatively include an object holder actuator pulling the object holder upwards to allow photopolymer material to fill the gap between object and glass plate thereby providing a layer of photopolymer material on the object holder or the object. The glass plate can also be above the photopolymer material instead of below and let the object holder pull downwards, where the principle of communicating vessels can be applied to make sure that the gap between the object and glass plate will be filled.

In an alternative embodiment, the coating device does not provide a complete layer of photopolymer material which is to be exposed selectively by the exposure system, but the coating device selectively provides photopolymer material that can integrally be cured.

In another alternative embodiment, the coating device is configured to involve ink jetting the compositions to produce a cohesive thin layer of photopolymer material onto the object holder and/or object, where cohesive means that the jetted droplets become blended into each other and a smooth layer is formed, where smooth means that the formed layer is flat and even, which may be achieved using a smoothing blade, e.g. a doctor blade going over the jetted surface. Alternatively or additionally, the jetted compositions have characteristics allowing them to blend seamlessly with neighbouring droplets. In case of ink jetting, the compositions to be jetted have jetting characteristics necessary for e.g. piezoelectric activated jetting devices, e.g. viscosities less than 100 cps, preferably below 70 cps, more preferably below 30 cps, at the required temperature for optimum jetting characteristics. As an example, the to be jetted photopolymer material may have a viscosity of 250 cps at room temperature and may therefore be jetted at a higher temperature, e.g. 70 degrees Celsius, to obtain a lower viscosity of e.g. 30 cps. To achieve this, diluents, such as oxetane, as part of the composition may be added which help to lower the viscosity and preferably provide strength on cure.

A combination of the above is also possible. The coating device may for instance comprise a coating apparatus configured to provide a layer of first material on the object holder or the object, and an inkjet printer to selectively provide a second material to the layer of first material, wherein the combination of the first and second material forms the photopolymer material. Hence, part of the photopolymer material is provided as a full layer of material and another part of the photopolymer material is selectively provided, so that the selective deposition of the second material determines where the photopolymer material is provided in which case selective illumination may no longer be necessary. However, selective illumination may still be applied as this may provide the advantage that the areas where the second material is provided remain cool, which provides better curing control.

In FIG. 1, an inkjet printer 5a is depicted as an additional part of the coating device, wherein the inkjet printer 5a is configured to selectively provide a second material to the object holder 3 or the object. The photopolymer material is delivered from a vat 5b holding the photopolymer material. An actuator system (not shown) may be provided to move the inkjet printer 5a with respect to the object holder 3, and/or the object holder actuator 17 may be configured to move the object holder 3 in a horizontal plane along the inkjet printer 5a.

It will be clear that the coating device 5 may only comprise the inkjet printer 5a to provide the photopolymer material onto the object holder and/or object, without the presence of the container 13 filled with liquid photopolymer material 15. The object holder 3 may be actuated by the object holder actuator 17 to move the object with respect to the exposure system and/or the inkjet printer 5a.

In such embodiment, the exposure system may be stationary, and the object holder may be moved by the object holder actuator 17, while the photopolymer material is continuously delivered to the surface of the object and the photopolymer material is continuously exposable to radiation with the first and second wavelength provided by the exposure system.

Again referring to the embodiment of FIG. 1, the exposure system 7 is configured to selectively illuminate the layer of photopolymer material resulting in the (partial) curing of the photopolymer material at the illuminated areas.

In an alternative embodiment that a next layer of photopolymer material is selectively provided, the exposure system may illuminate the entire layer at once and/or the light sources may not be individually addressable and tuneable.

The actuator 9 is configured for moving the exposure system 7 relative to the object holder 3 in a scanning direction 21. In this embodiment, the object holder 3 is stationary relative to a frame or housing 23 and the exposure is moveable relative to the object holder 3 by providing the actuator 9 between the exposure system 7 and the frame or housing 23. However, an alternative embodiment in which the exposure system is stationary relative to the frame or housing and the actuator is arranged to move the object holder relative to the frame or housing is also envisaged.

The exposure system 7 comprises a first array 25 of LEDs to expose the layer of photopolymer material to radiation with a first wavelength, and a second array 27 of LEDs to expose the layer of photopolymer material to radiation with a second wavelength different from the first wavelength.

The first and second array 25, 27 of LEDs are in this embodiment arranged such that an areas on the layer of photopolymer material first face the first or second array and subsequently the other one of the first and second array while moving the exposure system in the scanning direction.

In other words, the first 25 and second 27 array of LEDs are arranged such that while moving the exposure system 7 relative to the layer of photopolymer material in the scanning direction 21, each area on the layer of photopolymer material is first exposable to radiation with the first or second wavelength, and is subsequently exposable to radiation with the other one of the first and second wavelength.

Hence, the layer of photopolymer material can first be exposed with radiation having the first wavelength and subsequently with radiation having the second wavelength or vice versa depending on the moving direction of the exposure system relative to the object holder 3.

The LEDs of the first and/or second array of LEDs are individually addressable and preferably also individually tuneable.

The control unit 11 is configured to control the actuator 9 for moving the exposure system, the exposure system for illuminating the layer of photopolymer material, and the coating device for providing a layer of photopolymer material. The control unit may be in communication with a computer or other device to obtain information about the object to be formed.

Figure 2:
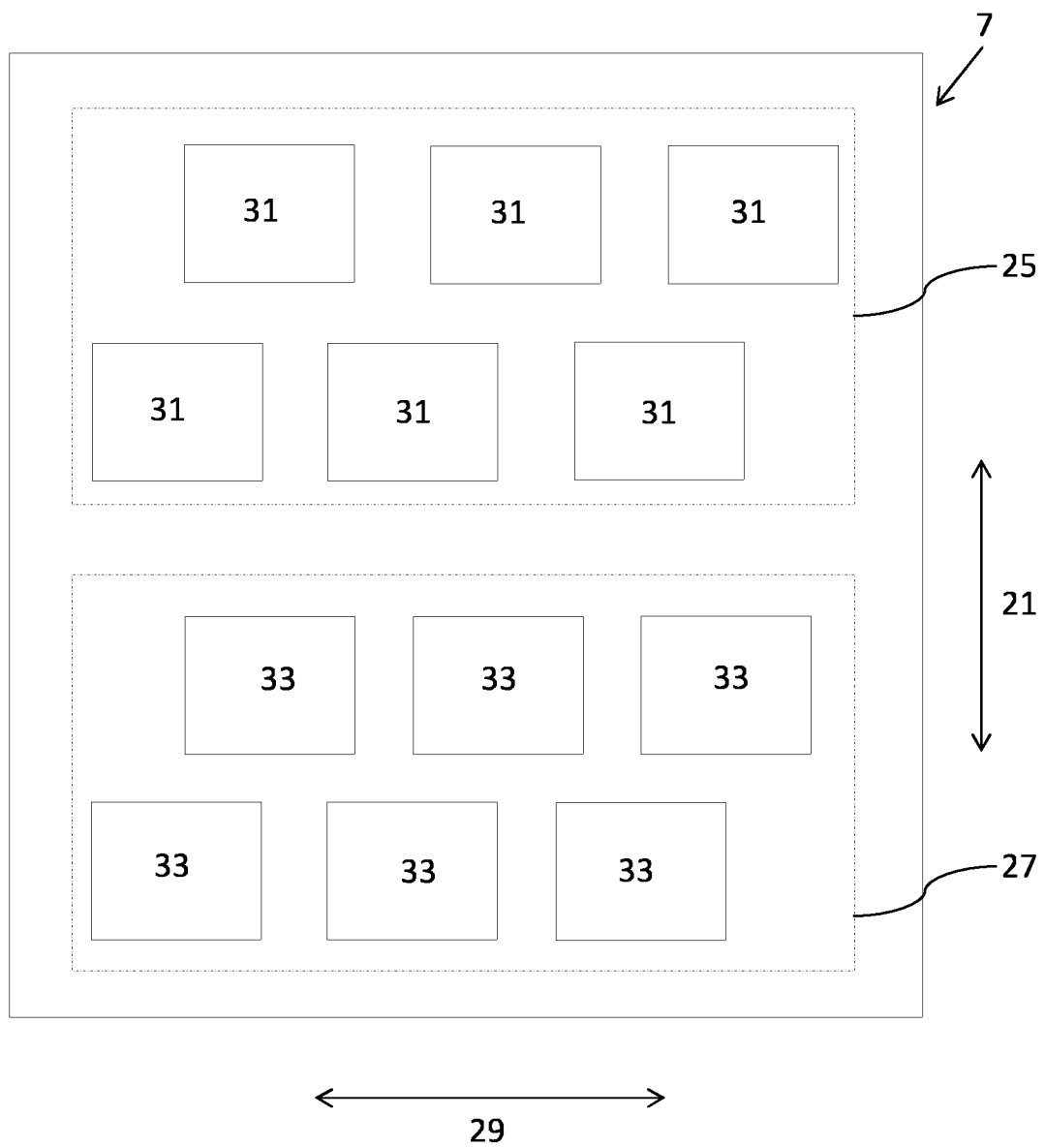
FIG. 2 schematically depicts the arrangement of LEDs on the exposure system of the printing system of FIG. 1.

FIG. 2 depicts the arrangement of LEDs on the exposure system 7 of the printing system 1 of FIG. 1. Shown in FIG. 2 are the scanning direction 21 and a transverse direction 29 perpendicular to both the scanning direction 21 and direction 19 (see FIG. 1) to indicate the orientation of the exposure system and its components.

FIG. 2 further depicts the first array 25 of LEDs formed by multiple assemblies 31 each comprising multiple rows of LEDs extending in the transverse direction 29, and the second array 27 of LEDs formed by multiple assemblies 33 each comprising multiple rows of LEDs extending in the transverse direction 29.

Preferably, the multiple assemblies 31 slightly overlap with each other in the transverse direction 29, allowing a predefined misalignment of the assemblies 31 in the transverse direction without resulting in areas on the layer of photopolymer material that cannot be illuminated by the first array 25 of LEDs.

Preferably, the multiple assemblies 33 slightly overlap with each other in the transverse direction 29, allowing a predefined misalignment of the assemblies 313 in the transverse direction without resulting in areas on the layer of photopolymer material that cannot be illuminated by the second array 27 of LEDs.

In the embodiment of FIG. 2, the first and second array are provided on a single member that may be moveable. In that case, the distance between the first and second array is preferably tuned to the photopolymer material used. However, it is also possible to provide the first array on a first moveable member and the second array on second moveable member, wherein the first and second moveable member are each separately driveable and controllable in order to move relative to the layer of photopolymer material. This also allows to tune the distance between the first and second array and/or the timing of the exposures by the first and second array.

Figure 3:
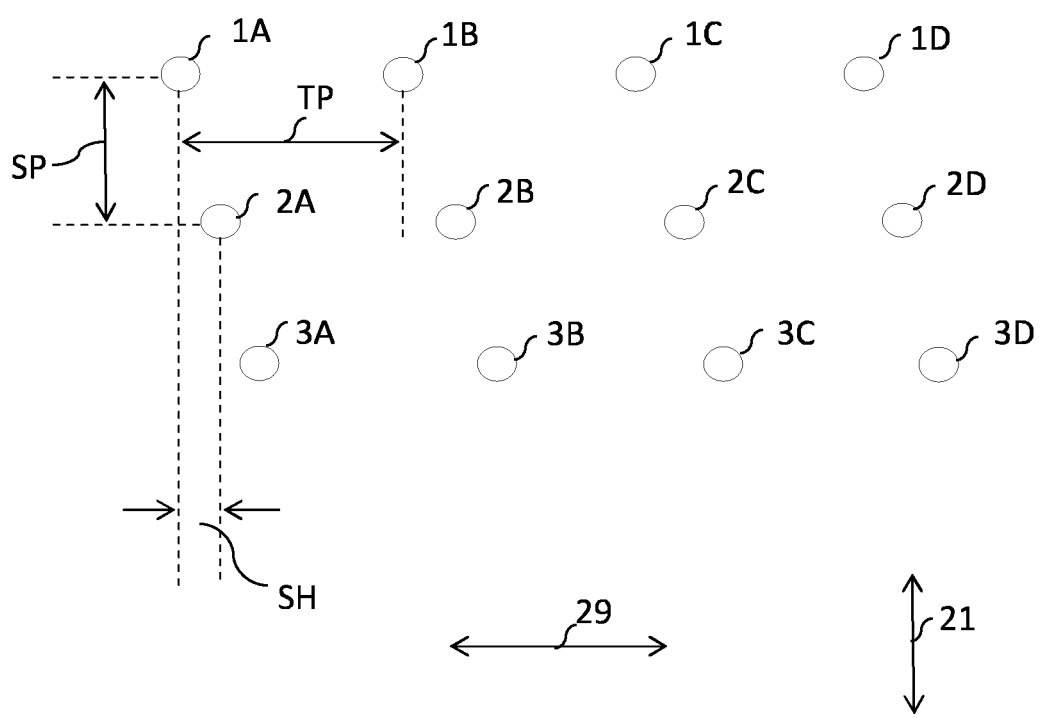
FIG. 3 depicts a detail of the arrangement of LEDs of FIG. 2.

FIG. 3 depicts in more detail the arrangement of the first four LEDs in the first three rows of the assemblies 31 and 33. Each LED has been given a reference symbol starting with the row number followed by an index indicating the position within the respective row. Hence, a LED indicated by reference symbol 2C is the third (in accordance with the letter "C" which is the third letter in the alphabet) LED in the second row (in accordance with the "2").

The transverse pitch between LEDs in a row is indicated by reference symbol TP, the scanning pitch between rows is indicated by reference symbol SP, and the shift between adjacent rows is indicated by reference symbol SH.

The transverse pitch TP and the scanning pitch SP are dimensions typically defined by the possibility to position the LEDs as close as possible to each other without interfering with each other and without losing the ability for individual control of the LEDs and usually does not correspond to the desired pitch between LEDs. To solve this, multiple rows are provided with each row being shifted in the transverse direction 29 over a distance SH corresponding to the desired pitch between LEDs. In principle, this configuration requires a minimum number of rows N equal to the round up ratio TP/SH to cover all LED positions in between adjacent LEDs in a row when the distance SH is equal to or smaller than the diameter of a LED. When not all LED positions are covered, multiple passes of the printhead are required to cover all areas on the substrate.

Preferably, more rows than the minimum number of rows are provided allowing a predefined misalignment in a rotational direction of the assemblies 31 and 33 about an axis extending in a direction parallel to direction 19 without resulting in areas on the layer of photopolymer material that cannot be sufficiently illuminated by the assemblies 31 and 33. Further, the additional rows provide redundancy in case of LED failure.

In particular, the number of rows above the minimum number of rows N is at least the rounded up value of the equation N*ds*sin($\alpha$)/SH, where ds is the scanning pitch SP between adjacent rows in the scanning direction, and where $\alpha$ is a predetermined maximum rotational error angle after assembly. Hence, $\alpha$ is the angular deviation of the desired orientation of the array of light sources. For instance, when the rows are intended to be parallel to the width direction 29 perpendicular to the scanning direction 21, $\alpha$ is the angle of the rows with respect to the width direction after assembly.

A small value for the distance SH is preferable, not only because this will ensure that all areas will be able to receive sufficient radiation, but also as this allows to obtain a predefined precision in illuminating the different areas of a substrate and compensate for differences in properties between LEDs and assemblies and for optical distortions present in the individual output of the LEDs. For instance, the distance SH may be different for each assembly of LEDs, but when the distance SH is sufficiently small, the intensity of the LEDs can be controlled such that the difference is compensated for during illumination.

It is to be noted that the LEDs may be larger than depicted in FIG. 3 and/or the resulting illumination spot on the layer of photopolymer material does not correspond to the size of the LED as depicted in FIG. 3, such that the LEDs effectively overlap in the transverse direction 29.

In that case, scanning columns can be defined over the layer of photopolymer material so that each scanning column has an associated set of LEDs able to illuminate areas in said scanning column, wherein illuminating an area in a scanning column requires to use all LEDs of the associated set to end up with the area receiving a desired cumulative dose of radiation.

Typically, LEDs emit light with an intensity profile in which the highest amount of light comes from the centre and decreases towards the edges, e.g. a Gaussian-like distribution. To increase the amount of light input, micro-mirrors may be used around the LED. The consequence may be that much of the light is coming from the mirrors instead of directly from the light source, so that an intensity profile may be obtained in which the intensity at the edge is maximum.

In principle, turning on and off light sources while moving the light source in the scanning direction will lead to an intensity landscape on the layer of photopolymer material in which the intensity at the start and end are significantly lower than in the middle. If this leads to a cumulative dose below a desired level, this may cause a problem. To solve this, the intensity of the LED may be increase at the start and end or an additional LED when passing over the same area provides additional radiation at the start and end area. Although this may lead to other areas being overexposed, this is usually less of a problem.

When adjacent LEDs in the transverse direction are turned on to form a 'line' that can be scanned over the layer of photopolymer material, the overlapping intensities create a similar intensity landscape in which at the start and end of the line the intensity is lower than in the middle of the line. By adjusting the intensities of individual LEDs in the line, an intensity profile can be obtained with a relatively steep edge at the start and end of the line resulting in less material being partially cured at the edges of the line.

Such ability to vary the intensity landscape of the exposure, particularly also by having the dual cure capability, allows unexpected high control of cure to the desired depth and shape, and with respect to the overall position of the image. Hence, a sharp edge is achieved at the required final surfaces according to the size of the cured polymer, and better inter spot curing is achieved in internal parts of the cured image.

The individual addressability of the LEDs in combination with the provision of two different wavelengths allow to use new methods to form objects having for instance an improved strength, improved surface qualities, and/or less reliance on support structures. An example of such a new method will be explained by reference to drawings 4A to 4F, though this is to be seen as merely an example. The method according to the fifth aspect of the invention enables numerous exposure sequences to be realised according to the features required in the final cured polymer.

Please note that the advantages of the LED assembly as depicted in FIG. 3 can also be obtained by arranging the LEDs in an array with a zero shift SH between adjacent rows, but by rotating the entire LED assembly or member to which the LED assembly is mounted.

The LEDs may be high intensity LEDs to achieve the desired intensity levels required for the photopolymer materials used.

Figure 4A:
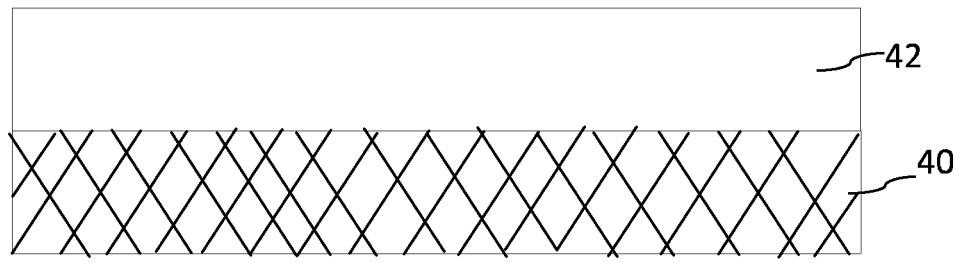
FIG. 4A-4F depict subsequent steps in an exemplary method according to a fifth aspect of the invention.

FIGS. 4A to 4F depict in cross section the formation of a part of an object. FIG. 4A depicts a previously cured layer 40 and on top of that layer 40 a new layer 42 of photopolymer material having a dual wavelength sensitivity meaning that it is sensitive to a radiation with a first wavelength and a radiation with a second wavelength different from the first wavelength.

In the FIGS. 4A to 4F it is assumed that the entire shown layer of photopolymer material needs to be cured in accordance with corresponding patterns.

Figure 4B:
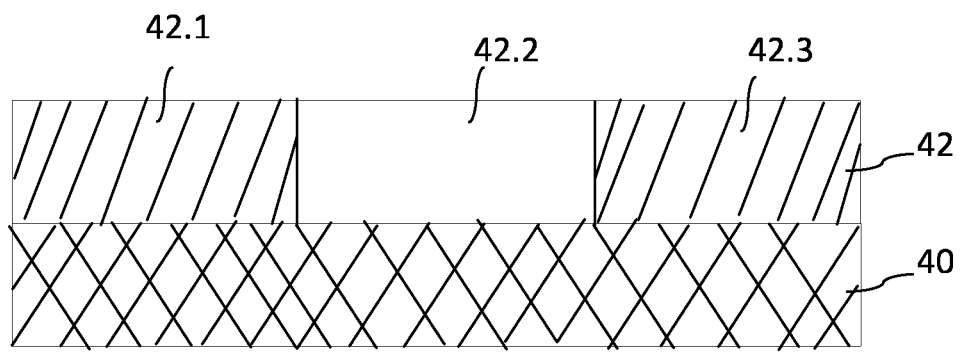

Hence, although the entire layer 42 of FIG. 4A needs to be cured, the subsequent step in the method is to partially expose the layer 42 to radiation with the first wavelength resulting in polymerization in the exposed areas 42.1 and 42.3 and no polymerization in the non-exposed area 42.2 as depicted in FIG. 4B.

Figure 4C:
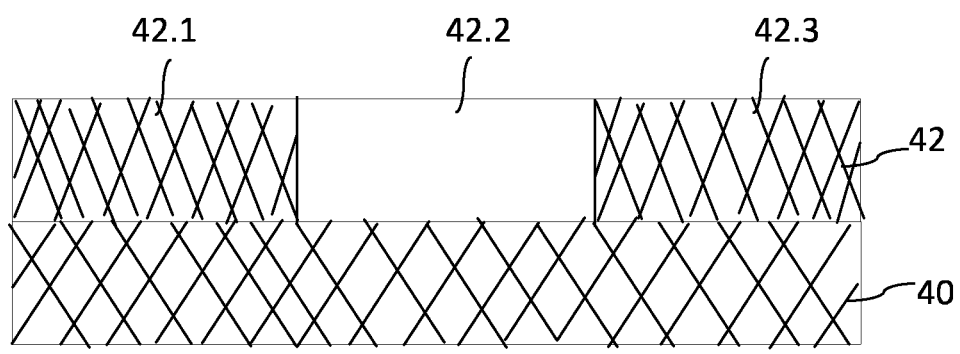

Subsequently, the areas 42.1 and 42.3 are exposed to radiation with the second wavelength thereby curing the material, i.e. creating cross links between polymer chains, to further solidify and harden the material. This is indicated in FIG. 4C. It is to be noted that although area 42.2 needs to be cured as well, this area has not received any radiation yet.

Figure 4D:
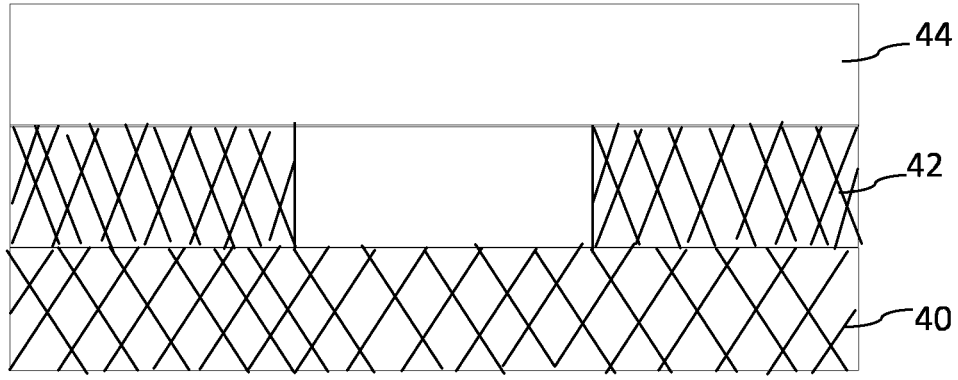
Figure 4E:
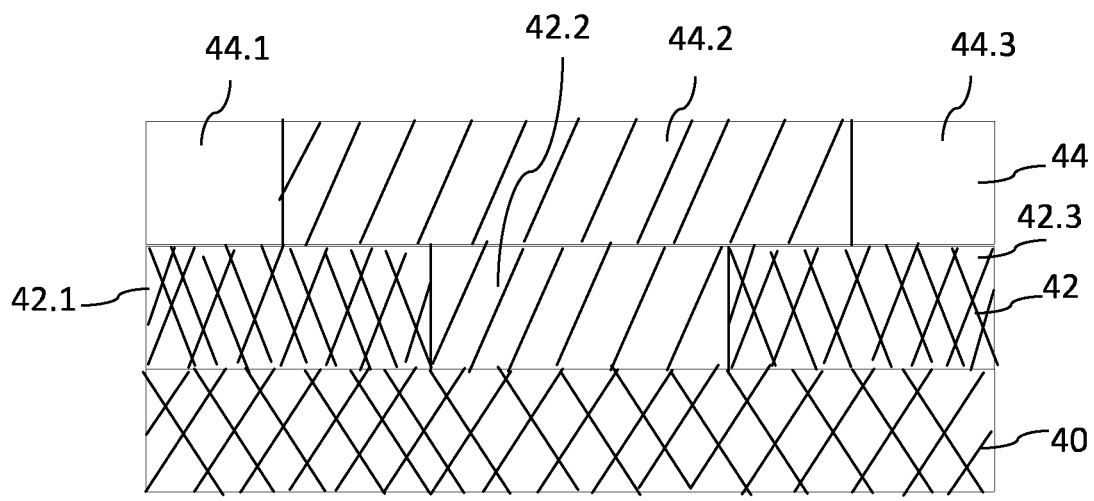
Figure 4F:
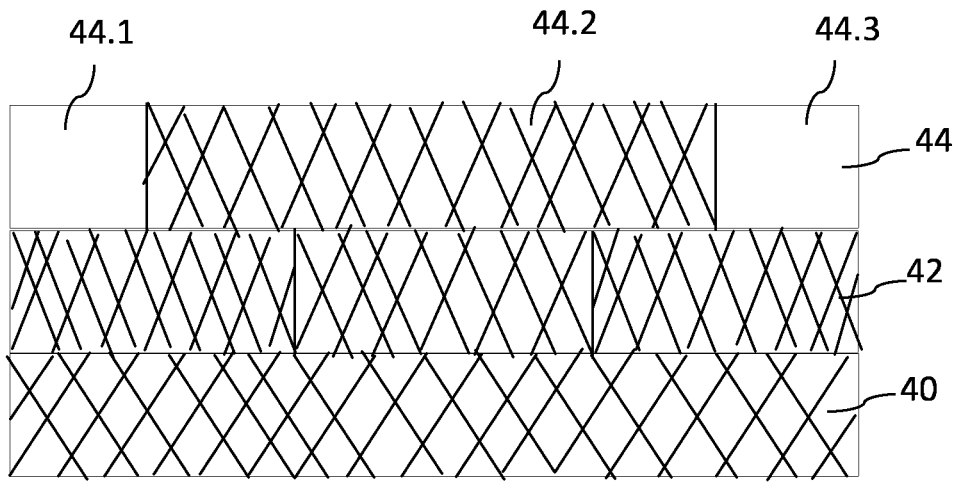

FIG. 4D depicts the formation of a next layer 44 of photopolymer material on top of layer 42 while area 42.2 in layer 42 has not received any radiation yet. Due to this configuration while applying a new layer of photopolymer material, it helps to avoid that photopolymer material can be entrapped by cured areas, as photopolymer material is able to flow through the channels (area 42.2) created in the previous layer thereby levelling the photopolymer material across the entire top surface.

In step 4E, the result after exposing the layer 44 partially with radiation with the first wavelength is shown. The area 44.2 of the layer 42 has been exposed as well, so that polymerization has taken place in areas 42.2 and 44.2, while no polymerization has taken place in areas 44.1 and 44.3, thereby allowing to form channels at different locations this time which reduces the weakening of this structure introduced by this new method of partial exposures of each layer.

In step 4F, the areas in layer 44 that have been exposed to the radiation with the first wavelength has also been exposed to radiation with the second wavelength thereby curing the areas 42.2 and 44.2.

Another exemplary method according to the fifth aspect of the invention will be explained by reference to drawings 5A to 5F.

It is to be noted here explicitly that the above described method in relation to FIGS. 4A-4F, also works when only one wavelength is used to cure the photopolymer material. The single wavelength may then be varied in intensity to form channels where photopolymer material can flow through, which channels are later on closed and new channels are formed at other places for the same reason.

Figure 5A:
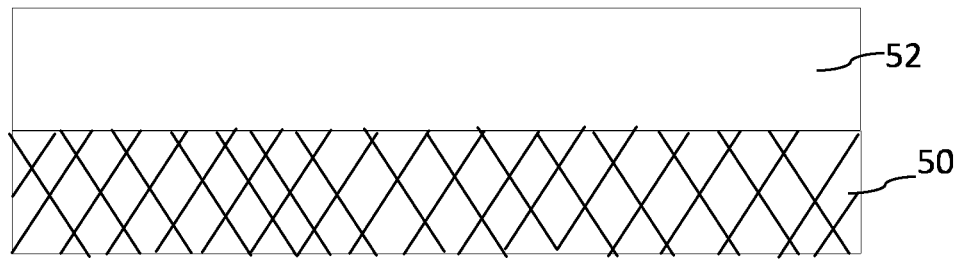
FIG. 5A-5F depict subsequent steps in another exemplary method according to the fifth aspect of the invention.

FIGS. 5A to 5F depict in cross section the formation of a part of an object. FIG. 5A depicts a previously cured layer 50 and on top of that layer 50 a new layer 52 of photopolymer material having a dual wavelength sensitivity meaning that it is sensitive to a radiation with a first wavelength and a radiation with a second wavelength different from the first wavelength.

In the FIGS. 5A to 5F it is assumed that the entire shown layer of photopolymer material needs to be cured in accordance with corresponding patterns.

Figure 5B:
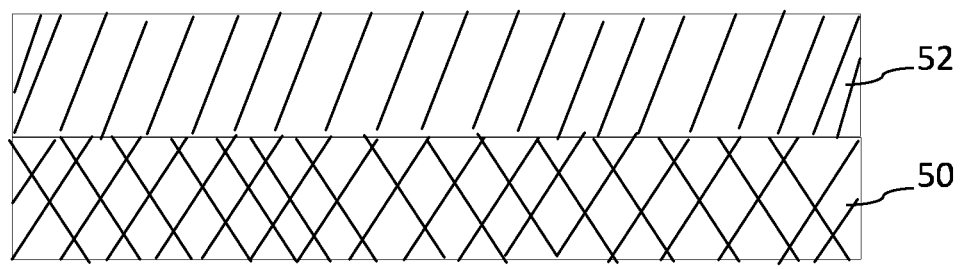

Hence, subsequently, the entire layer 52 of photopolymer material is exposed to radiation with the first wavelength as shown in FIG. 5B resulting in polymerization in the exposed areas.

Figure 5C:
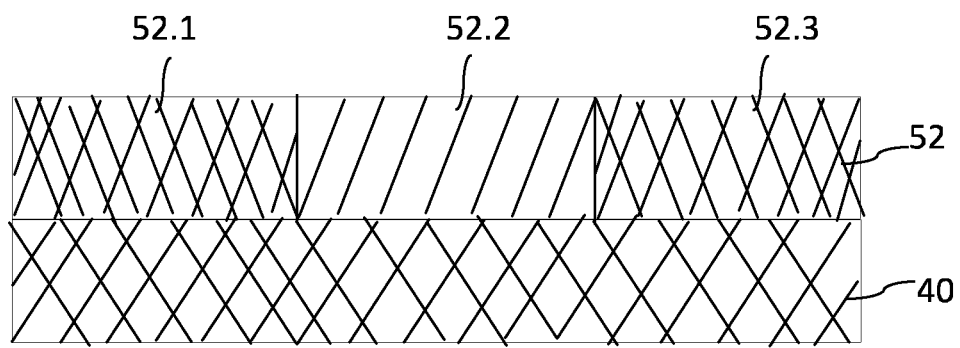

After that, areas 52.1 and 52.3 are exposed to radiation with the second wavelength thereby curing the material, i.e. creating cross links between polymer chains, to further solidify and harden the material. This is indicated in FIG. 5C. It is to be noted that although area 52.2 needs to be cured as well, this area has not received radiation with the second wavelength yet.

Figure 5D:
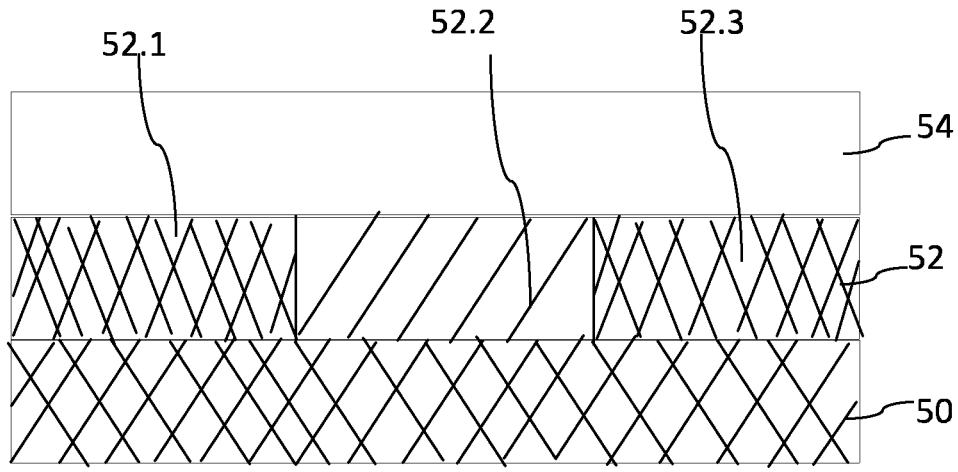
Figure 5E:
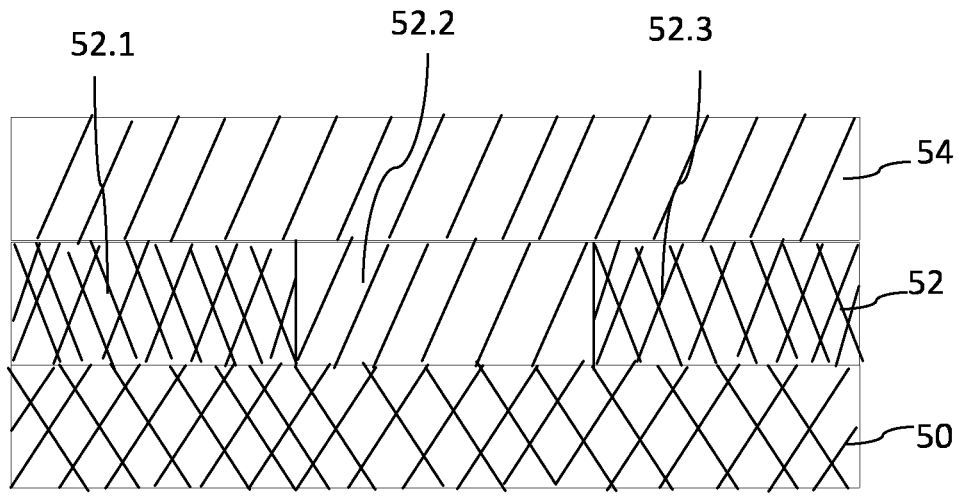
Figure 5F:
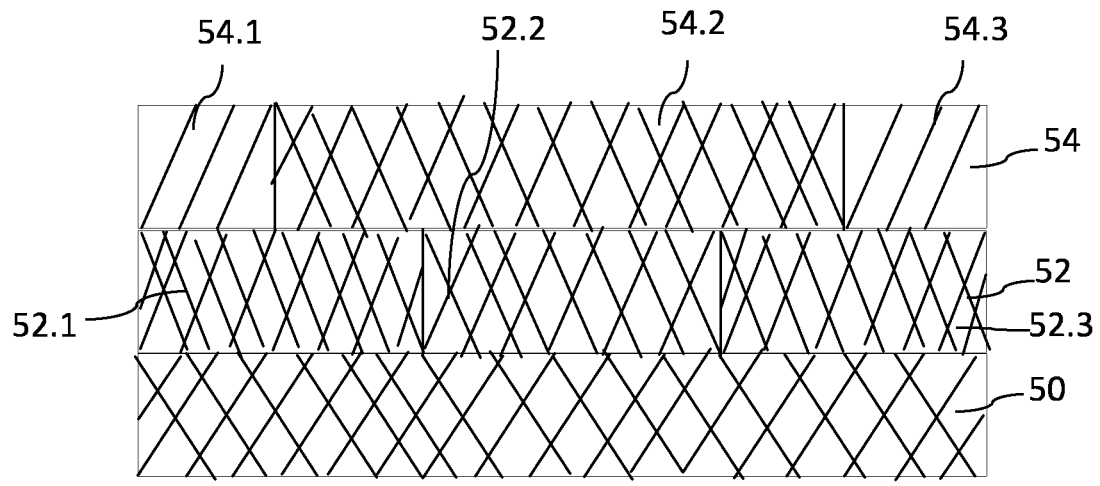

FIG. 5D depicts the formation of a next layer 54 of photopolymer material on top of layer 52 while area 52.2 in layer 52 has not received radiation with the second wavelength yet.

In step 5E, the next layer 54 has been exposed to radiation with the first wavelength, wherein preferably at the location of area 52.2, the radiation dose is increased relative to areas 52.1 and 52.3. This will cause polymerization in the layer 54, but also form chains crossing the boundary between layer 52 and 54 at area 52.2, so that the connection between layers 52 and 54 is improved.

Subsequently, area 54.2 is exposed to radiation with the second wavelength, wherein preferably at the location of area 52.2, the radiation dose is increased relative to other areas, to achieve curing at a greater depth, i.e. in area 52.2, as well. Areas 54.1. and 54.3 are in this case not exposed to radiation with the second wavelength, so that an improved connection with a next layer can be made at these locations.

Such ability to vary at will the extent of curing, according to the position in the image to be polymerised provides immense benefits to controlling the quality of the final image, either in the single layer or in multiple layers. Issues of warping, layer curl, and incomplete curing, amongst and including other features, are resolvable using the printing method and associated compositions and processes.

Figure 6:
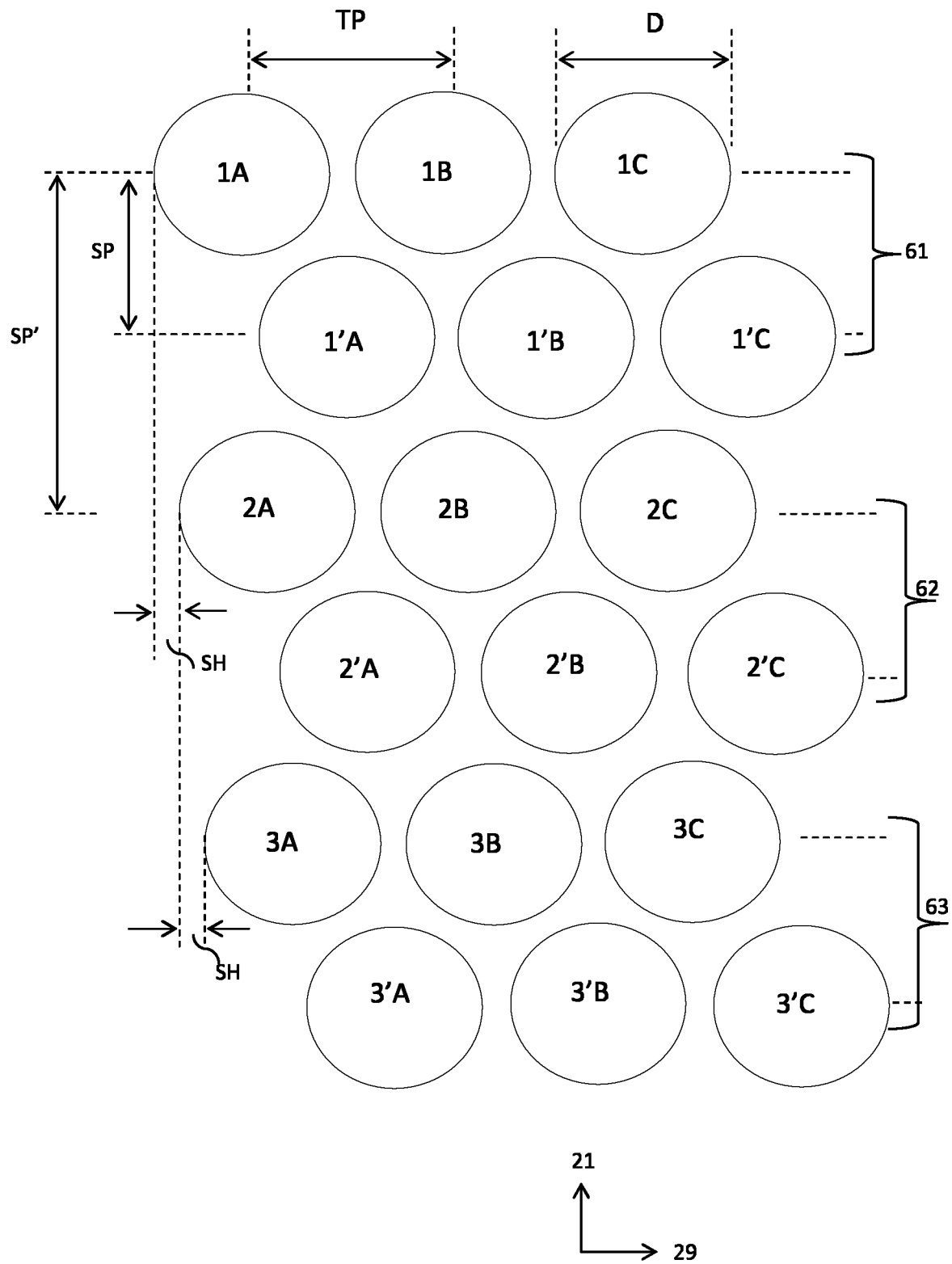
FIG. 6 schematically depicts a detail of a LED assembly according to another embodiment of the invention.

FIG. 6 schematically depicts a detail of a LED assembly according to another embodiment of the invention. This LED assembly can for instance also be used in an arrangement of LEDs as depicted in FIG. 2.

Shown are three row structures 61, 62, 63, wherein each row structure comprises a first row with LEDs extending in a transverse direction 29 at a pitch TP from each other and a similar second row shifted 0.5*TP with respect to the first row. The LEDs in the first row of the first row structure 61 have a reference symbol starting with 1. The LEDs in the second row of the first row structure 61 have a reference symbol starting with 1'. The LEDs in the first row of the second row structure 62 have a reference symbol starting with 2. The LEDs in the second row of the second row structure 62 have a reference symbol starting with 2'. The LEDs in the first row of the third row structure 63 have a reference symbol starting with 3. The LEDs in the second row of the third row structure 63 have a reference symbol starting with 3'. Each reference symbol for the LEDs is followed by an index A, B or C indicating the position within the respective row. Hence, a LED indicated by reference symbol 2'C is the third (in accordance with the letter "C" which is the third letter in the alphabet) LED in the second row (indicated by the "'") of the second row structure (indicated by the "2").

The first and second row of each row structure are at a distance SP from each other in a scanning direction 21. The first rows of adjacent row structures are at a distance SP' from each other, wherein SP' is preferably at least two times distance SP.

Adjacent row structures are shifted over a distance SH with respect to each other, wherein SH is smaller than a diameter D of the LEDs.

Although for simplicity reasons the LEDs are positioned close to each other to fit on the page, the distance TP may be much larger than the diameter D of the LEDs.

An important characteristic of the LED assembly may be that sufficient light is available over the entire width of the assembly taking into account assembly tolerances and alignment errors.

Especially when a single LED is not able to provide sufficient light, multiple LEDs should be arranged in a scanning column, so that the sum of LEDs provided in a scanning column is able to provide sufficient light. For this reason, the shift SH is preferably much smaller than the diameter D of the LEDs, so that LEDs overlap each other in the transverse direction 29.

Preferably, more LEDs than required to provide sufficient light are provided in a scanning column allowing to tune the individual intensities in a LED while being able to provide sufficient light in order to obtain a homogeneous light profile over the entire width of the LED assembly.

By providing more row structures than required to obtain sufficient light and coverage, the LED assembly is able to compensate for rotational alignment errors. By overlapping adjacent LED assemblies, the LED assemblies are able to compensate for transverse alignment errors. Where the LED assemblies overlap, it has to be determined which LEDs from which LED assembly cooperate with each other to provide sufficient light and coverage.

A minimum number of row structures N can be determined by the rounded up ratio TP/SH, wherein TP is the transverse pitch and SH is the smallest distance between different row structures.

In addition, the number of row structures above the minimum number of row structures N may be at least the rounded up value of the equation $N*ds*\sin(\alpha)/SH$, where ds is the scanning pitch SP' between adjacent row structures in the scanning direction, and where $\alpha$ is a predetermined maximum rotational error angle after assembly. Hence, $\alpha$ is the angular deviation of the desired orientation of the array of light sources. For instance, when the rows are intended to be parallel to the width direction 29 perpendicular to the scanning direction 21, α is the angle of the rows with respect to the width direction after assembly.

The row structures in fact lead to a repetitive configuration of light sources, with a repetition of n=2. The minimum number of rows N can then be determined by the rounded up ratio n*TP/SH. The number of rows above the minimum number of rows can then be determined by the rounded up value of the equation N*ds*sin(α)/SH.

The total number of rows is then n*TP/SH+n*TP*ds*sin(α)/SH$^2$.

Figure 7:
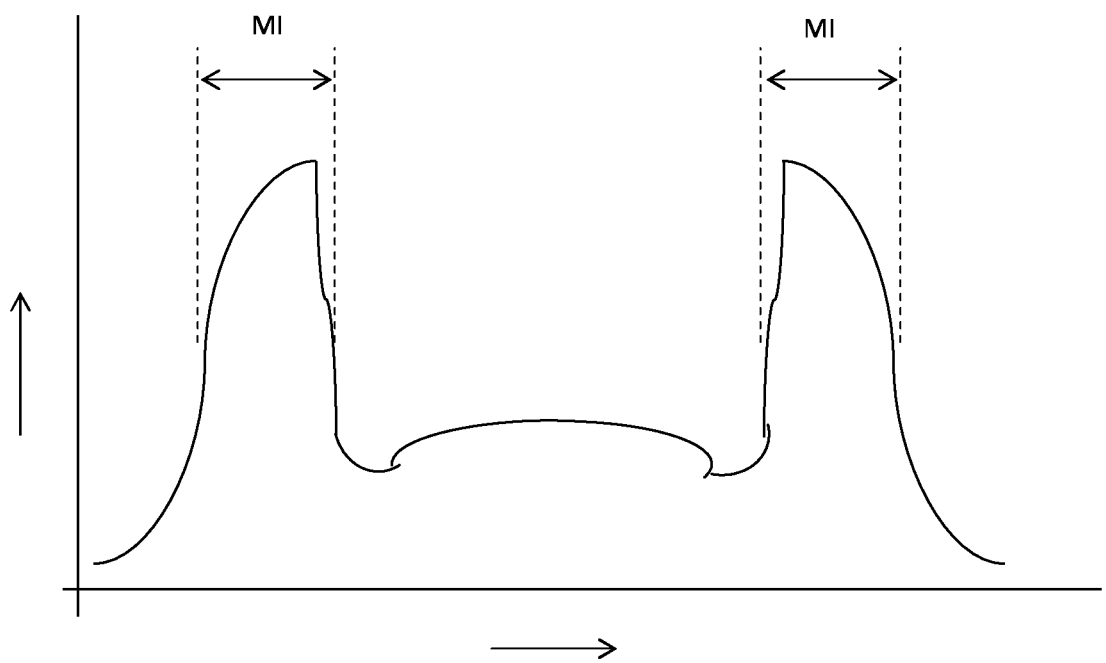
FIG. 7 schematically depicts an intensity profile emitted by a LED.

FIG. 7 depicts a possible intensity profile emitted by a LED for an intersection through the centre of the LED. The intensity is the largest at the outer edges of the LED, which may be caused by mirroring surfaces surrounding the LED. The intensity is maximal over a distance MI. When such LEDs are used in for instance the LED assembly as depicted in FIG. 6, the distance SH between adjacent row structures is preferably equal to or smaller than the distance MI for maximal control of the light distribution over the entire width of the LED assembly including possible alignment errors, etc.

The high intensity at the edges of the LED also allow to obtain a light distribution profile with more steep edges. This feature can be used to achieve even greater cure at the outer surfaces of the product.

In the case the LEDs are individually addressable and LED assemblies overlap, a calibration may be required to determine the optimal combination of LEDs to be addressed such that there is a seamless transition from one assembly to the next, where non-addressed LEDs serve as back-up or are used for situations in which more light is required.

In the case the LEDs are individually addressable and tuneable, calibration may be required, not only for the addressability, but also for the intensity of each individual LED so that the transition between LED assemblies is seamless, but also the light distribution over the entire width is homogeneous. Further, when applied to both the first and second arrays of light sources, the transition from the first array to the second array of light sources can also be made seamless despite mutual differences between the two.

In the description reference is made to a scanning column. A scanning column is in principle smaller than a diameter of a LED and also equal to or smaller than a desired resolution in the transverse direction. The exact width of a scanning column may be chosen on the ability to group multiple LEDs in the scanning column that once calibrated can be controlled as a group (thereby reducing the complexity of controlling all LEDs) while obtaining sufficient performance with respect to light intensity and homogeneity over the entire width of the LED assemblies.

The following embodiments of the invention may be combined in any fashion and combination and be within the scope of the present invention, as follows:

Embodiment 1

A printing system comprising:
a. an object holder configured to hold an object;
b. a coating device for providing a layer of photopolymer material on the object holder or the object;
c. an exposure system for illuminating the layer of photopolymer material;
d. an actuator for moving the exposure system relative to the object holder in a scanning direction;
wherein the exposure system comprises a first lighting device to expose the layer of photopolymer material to radiation with a first wavelength,
wherein the exposure system comprises a second lighting device to expose the layer of photopolymer material to radiation with a second wavelength different from the first wavelength,
wherein the first lighting device comprises a first array of light sources,
wherein the light sources of the first array are individually addressable,
and wherein the first and second lighting device are arranged such that while moving the exposure system relative to the layer of photopolymer material in the scanning direction, an area on the layer of photopolymer material is first exposable to radiation with the first or second wavelength, and is subsequently exposable to radiation with the other one of the first and second wavelength.

Embodiment 2

A printing system according to embodiment 1, wherein the second lighting device comprises a second array of light sources, and wherein the light sources of the second array are individually addressable.

Embodiment 3

A printing system according to embodiment 1, wherein the first wavelength is in the UV or infrared range, and wherein the second wavelength is in the other one of the UV and infrared range.

Embodiment 4

A printing system according to any of the embodiments 1-3, wherein the light sources are micro lasers.

Embodiment 5

A printing system according to any of the embodiments 1-3, wherein the light sources are LEDs.

Embodiment 6

A printing system according to any of the embodiments 1-5, wherein the light sources are individually tuneable.

Embodiment 7

A printing system according to any of the embodiments 1-6, wherein the exposure system comprises a first moveable member including the first lighting device, and a second moveable member including the second lighting device, and wherein the first and second moveable member are each separately driveable and controllable in order to move relative to the layer of photopolymer material.

Embodiment 8

A printing system according to any of the embodiments 1-7, wherein the exposure system comprises a third lighting device to expose the layer of photopolymer material to radiation with the first wavelength, wherein the second lighting device is arranged in between the first and third lighting devices.

Embodiment 9

A printing system according to any of the embodiments 1-8, wherein the coating device is configured to selectively provide photopolymer material on the object holder or the object, in particular an inkjet printer.

Embodiment 10

A printing system according to any of the embodiments 1-9, wherein the coating device is configured to provide the photopolymer material by providing a first component of the photopolymer material as a powder layer and to selectively provide a second component of the photopolymer material, preferably by jetting the second component on the powder layer, such that the first and second component can be combined to form the photopolymer material.

Embodiment 11

A printing system according to any of the embodiments 1-10, wherein the first array of light sources extends in the scanning direction and a width direction perpendicular to the scanning direction, and wherein light sources of the first array at least partially overlap with at least two other light sources seen in the width direction.

Embodiment 12

Composition comprising:
a. 20 to 95 wt % of a liquid resin having a ring-opening functionality;
b. 0.1 to 10 wt % of a photoinitiator for the liquid resin having a ring-opening functionality;
c. 5 to 25 wt % of a liquid aliphatic, cycloaliphatic and/or aromatic acrylate;
d. 0.1 to 10 wt % of a radical photoinitiator for the liquid aliphatic, cycloaliphatic and/or aromatic acrylate; and
e. 0.1 to 10 wt % of an infrared absorber or sensitizer.

Embodiment 13

Composition according to embodiment 12, wherein the liquid aliphatic, cycloaliphatic or aromatic acrylate is a multifunctional acrylate.

Embodiment 14

Composition according to embodiment 12 or 13, further comprising at most 15 wt % of a liquid methacrylate having methacrylate functionality, wherein the total content of liquid aliphatic, cycloaliphatic and/or aromatic acrylate and liquid methacrylate is maximum 30 wt %, and wherein the radical photoinitiator is also for the liquid methacrylate.

Embodiment 15

Composition according to any of the embodiments 12-14, wherein the composition further comprises 5 to 40 wt % of an OH-terminated or ester terminated compound.

Embodiment 16

Composition according to any of the embodiments 12-15, wherein the composition further comprises 0.1-10 wt % of liquid resin comprising block copolymer segments.

Embodiment 17

Composition comprising:
a. 75 to 98 wt % of a liquid acrylic resin, which is an aliphatic, cycloaliphatic or aromatic acrylate, or 65 to 98% of a liquid photopolymer having a ring-opening functionality;
b. 0.1 to 10 wt % of a liquid resin comprising block copolymer segments; and
c. 0.1 to 5 wt % of a photoinitiator which has absorbance in the wavelength range of 250-850 nm.

Embodiment 18

Composition according to embodiment 17, wherein the photoinitiator is a radical or cationic photoinitiator.

Embodiment 19

Composition according to embodiment 17 or 18, further comprising 0.1 to 10 wt % of an infrared absorber or sensitizer.

Embodiment 20

Composition according to any of the embodiments 17-19, wherein the liquid resin comprising block copolymer segments has at least one polymerisable group.

Embodiment 21

Use of a composition according to any of the embodiments 12-20 in manufacturing photopolymerized layers.

Embodiment 22

Use of a composition according to embodiment 21, wherein the composition is first exposed to UV radiation and subsequently exposed to infrared radiation or vice versa.

Embodiment 23

Use of a composition according to embodiment 21 or 22, wherein the composition is used in a printing system according to any of the embodiments 1-11.

Embodiment 24

A method for additive manufacturing, said method comprising the following steps:
a. providing a first layer of photopolymer material sensitive to both radiation with a first wavelength and radiation with a second wavelength different from the first wavelength;
b. providing a first pattern corresponding to to be cured areas in the first layer;
c. at least partially exposing the to be cured areas in the first layer to radiation with the first wavelength;
d. at least partially exposing the to be cured areas to radiation with the second wavelength, wherein the areas exposed to radiation with the second wavelength also have been exposed to radiation with the first wavelength.

Embodiment 25

A method according to embodiment 24, further comprising the following steps:
- e. providing a second layer of photopolymer material sensitive to both radiation with the first wavelength and radiation with the second wavelength next to the first layer;
- f. providing a second pattern corresponding to to be cured areas in the second layer;
- g. at least partially exposing the to be cured areas in the second layer to radiation with the first wavelength, wherein the exposed areas in the second layer at least correspond to to be cured areas in the first layer that have not previously been exposed to radiation with the second wavelength;
- h. at least partially exposing the to be cured areas in the second layer to radiation with the second wavelength, wherein the exposed areas in the second layer at least correspond to to be cured areas in the first layer that have not previously been exposed to radiation with the second wavelength.

Embodiment 26

A method according to embodiment 24 or 25, wherein the first wavelength is in the UV or infrared range, and wherein the second wavelength is in the other one of the UV and infrared range.

Embodiment 27

A method according to any of the embodiments 24-26, wherein the photopolymer material is a composition according to any of the embodiments 12-20.

Embodiment 28

A method according to any of the embodiments 24-27, wherein the steps are carried out by a printing system according to any of the embodiments 1-11.

Embodiment 29

A method according to embodiment 25, wherein to be cured areas in the first layer that are not exposed to radiation with the first wavelength in step c. are selected on the basis of the second pattern such that in step g. the exposed areas in the second layer at least correspond to to be cured areas in the first layer that have not previously been exposed to radiation with the first wavelength.

Embodiment 30

A method according to embodiment 25, wherein all to be cured areas in the respective layer are exposed to radiation with the first wavelength in step c. and g., and not all to be cured areas in the respective layer are exposed to radiation with the second wavelength in step d. and h.

Embodiment 31

A method according to embodiment 25, wherein the exposed areas in the second layer that correspond to to be cured areas in the first layer that have not previously been exposed to radiation with the second wavelength receive a higher radiation dose of radiation with the second wavelength than exposed areas in the second layer that correspond to to be cured areas in the first layer that have previously been exposed to radiation with the second wavelength.

Embodiment 32

An exposure system for selectively illuminating a layer of photopolymer material, comprising:
- a. a first lighting device with a first array of LEDs to expose the layer of photopolymer material to radiation with a first wavelength;
- b. a second lighting device to expose the layer of photopolymer material to radiation with a second wavelength;

wherein the LEDs of the first array are individually addressable, and wherein the first and second lighting device are arranged such that while moving the exposure system relative to the layer of photopolymer material in a scanning direction, an area on the layer of photopolymer material is first exposable to radiation with the first or second wavelength, and is subsequently exposable to radiation with the other one of the first and second wavelength.

Embodiment 33

An exposure system according to embodiment 32, wherein the second lighting device comprises a second array of LEDs, and wherein the LEDs of the second array are individually addressable.

Embodiment 34

An exposure system according to embodiment 32 or 33, wherein the LEDs are individually tuneable.

Embodiment 35

An exposure system according to any of embodiments the 32-34, wherein the first wavelength is in the UV or infrared range, and wherein the second wavelength is in the other one of the UV and infrared range.

Embodiment 36

An exposure system according to any of the embodiments 32-35, wherein the exposure system comprises a first moveable member including the first lighting device, and a second moveable member including the second lighting device, and wherein the first and second moveable member are each separately driveable and controllable in order to move relative to the layer of photopolymer material.

Embodiment 37

An exposure system according to any of the embodiments 32-36, further comprising a third lighting device to expose the layer of photopolymer material to radiation with the first wavelength, wherein the second lighting device is arranged in between the first and third lighting devices.

Embodiment 38

An exposure system according to any of the embodiments 32-37, wherein the first array of LEDs extends in a scanning direction and a width direction perpendicular to the scanning direction, and wherein LEDs of the first array at least partially overlap with at least two other light sources seen in the width direction.

Embodiment 39

An exposure system according to any of the embodiments 32-38, wherein the light sources are LEDs including micro mirrors to direct light from the LEDs to the photopolymer material.

Embodiment 40

A printing system comprising:
a. an object holder configured to hold an object;
b. a device for providing photopolymer material on the object holder or the object; and
c. an exposure system for illuminating the photopolymer material;
wherein the exposure system comprises a first light source to expose the photopolymer material to radiation with a first wavelength and a second light source to expose the photopolymer material to radiation with a second wavelength.

Embodiment 41

A printing system according to embodiment 40, wherein the device for providing photopolymer material on the object holder or the object comprises an inkjet printer.

Embodiment 42

A printing system according to embodiment 40 or 41, wherein the exposure system comprises a third light source to expose the photopolymer material to radiation with a third wavelength.

Embodiment 43

A printing system according to any of the embodiments 40-42, wherein the first wavelength is in the UV range or in the infrared range, wherein the second wavelength is in the other one of the UV and infrared range, and wherein the UV range includes wavelengths in the range of 200 nm-450 nm and the infrared range includes wavelengths in the range of 620 nm-1200 nm.

Embodiment 44

A printing system according to any of the embodiments 40-43, wherein each of the first wavelength and the second wavelength is selected to trigger polymerization.

Embodiment 45

A printing system according to any of the embodiments 40-44, wherein the light sources are individually addressable.

Embodiment 46

A printing system according to any of the embodiments 40-45, wherein the light sources are individually tunable.

Embodiment 47

A printing system comprising:
a. an object holder configured to hold an object;
b. a device for providing photopolymer material on the object holder or the object;
c. an exposure system for illuminating the photopolymer material; and
d. an actuator for moving the exposure system relative to the object holder in a scanning direction,
wherein the exposure system comprises an array of light sources to expose the photopolymer material to radiation with a first wavelength, wherein the array extends in the scanning direction and a width direction perpendicular to the scanning direction, and wherein light sources at least partially overlap with at least two other light sources seen in the width direction.

Embodiment 48

A printing system according to embodiment 47, wherein the light sources are LEDs, preferably micro led's, more preferably micro LEDs including micro mirrors to direct light from the LEDs to the photopolymer material.

Embodiment 49

A printing system according to embodiments 47 or 48, where the device for providing photopolymer material on the object holder or the object comprises an inkjet printer

Embodiment 50

A printing system according to any of the embodiments 47-49, wherein the exposure system comprises a collimator for each light source to collimate light emitted by the light source.

Embodiment 51

A printing system according to embodiment 50, wherein the collimator is a dome-shaped lens element arranged on each light source.

Embodiment 52

A printing system according to any of the embodiments 47-51, wherein the exposure system comprises a blocking element configured to block light emitted by the LED device at angles above a predetermined threshold angle with respect to a main direction of the light.

Embodiment 53

A printing system according to any of the embodiments 47-52, wherein the exposure system comprises a lens for each array of light sources to focus light emitted by the array of light sources.

Embodiment 54

A printing system according to embodiment 53, wherein the lens is placed near the light source.

Embodiment 55

A printing system according to any of the embodiments 47-54, wherein the printing system comprises a light intensity sensor system arranged to measure the light intensity and/or the position of the individual light source images.

Embodiment 56

A printing system according to embodiment 55, wherein the measured light intensities and/or positions of the individual light source images are used to tune power of the light sources individually.

Embodiment 57

A printing system according to any of the embodiments 55 or 56, wherein the measured light intensities of the individual light sources are used to mechanically adjust the position of the arrays of light sources relative to each other.

Embodiment 58

A printing system according to any of the embodiments 47-57, wherein the light sources at least partially overlap with at least four other light sources seen in the width direction.

Embodiment 59

A printing system according to any of the embodiments 47-58, wherein the light sources are arranged in rows and columns extending perpendicular to each other, and wherein the rows extend in a direction making an acute angle with the width direction.

Embodiment 60

A printing system according to any of the embodiments 47-59, wherein the light sources are arranged in rows extending parallel to the width direction, and wherein a smallest distance between rows seen in the width direction is smaller than a dimension of the light sources seen in the width direction.

Embodiment 61

A printing system according to embodiment 60, wherein the smallest distance between rows seen in the width direction is below 25% of the dimension of the light sources seen in the width direction, preferably at most 5 μm.

Embodiment 62

A printing system according to embodiment 60 or 61, wherein the number of rows is larger than N, with N being a positive integer determined by the rounded up ratio between a transverse pitch of the light sources in a row and the smallest distance between rows.

Embodiment 63

A printing system according to embodiment 62, wherein the number of rows above N is at least the rounded up value of $N*ds*\sin(\alpha)/SH$, where ds is a scanning pitch between adjacent rows in the scanning direction, where $\alpha$ is a predetermined maximum rotational error angle after assembly, and where SH is the smallest distance between rows.

Embodiment 64

A printing system according to embodiment 63, wherein the number of rows is a multiple of the sum of N and the rounded up value of $N*ds*\sin(\alpha)/SH$.

Embodiment 65

A printing system according to any of the embodiments 47-64, where the light sources are solid-state light sources.

Embodiment 66

A printing system according to embodiments 47-65, wherein the light sources are tunable with respect to a light intensity emitted by the light sources, and wherein the light sources are configured to provide an increased light intensity at the moment of turning the light sources on and/or at the moment of turning the light sources off.

Embodiment 67

A printing system according to embodiments 47-66, wherein the light sources are tunable with respect to a light intensity emitted by the light sources, and wherein the light sources are configured to provide an increased light intensity when the light sources contributes to the curing of an edge of an object to be cured.

Embodiment 68

A printing system comprising:
a. an object holder configured to hold an object;
b. a device for providing photopolymer material on the object holder or object;
c. an exposure system for illuminating the photopolymer material;
d. an actuator for moving the object holder relative to the exposure system;
wherein the exposure system comprises a lighting device having light sources to expose the layer of photopolymer material to radiation with a first wavelength and a second wavelength, wherein the light sources are individually addressable.

Embodiment 69

A printing system according to embodiment 68, wherein the exposure system comprises a light source to expose the photopolymer material to radiation with a third wavelength.

Embodiment 70

A printing system according to embodiment 68 or 69, wherein the first wavelength is in the UV range or in the infrared range, wherein the second wavelength is in the other one of the UV and infrared range, and wherein the UV range includes wavelengths in the range of 200 nm-450 nm and the infrared range includes wavelengths in the range of 620 nm-1200 nm.

Embodiment 71

A printing system according to any of the embodiments 68-70, wherein each of the first wavelength and the second wavelength is selected to trigger polymerization.

Embodiment 72

A printing system according to any of the embodiments 68-71, where the light sources are individually addressable.

Embodiment 73

A printing system according to embodiment 72, where the light sources are individually tunable.

Embodiment 74

A printing system according to embodiment 73, wherein the light sources are LEDs, preferably LEDs including micro mirrors to direct light from the LEDs to the photopolymer material.

Embodiment 75

A printing system according to any of the embodiments 68-74, wherein the device for providing photopolymer material on the object holder or object comprises a coating device, preferably comprising an inkjet printer.

Embodiment 76

A printing system according to any of the embodiments 68-75, wherein the device for providing photopolymer material on the object holder or object is arranged to move the object holder and/or an object supported on the object holder in a container filled with liquid photopolymer material to allow flow of liquid photopolymer material on an object surface being cured.

Embodiment 77

A printing system according to any of the embodiments 68-76, wherein all light sources are arranged such that while moving the layer of photopolymer material, an area on the fresh layer of photopolymer material is exposable to radiation with each wavelength.

Embodiment 78

A printing system according to embodiment 77, wherein the actuator moving the object holder and digital data sent to the light sources is synchronized in a continuous co-operative mode, preferably in such a way that seamless curing occurs in the photopolymer while there is seamless delivery of the digital data.

Embodiment 79

A printing system according to any of the embodiments 68-78, where the photopolymer comprises compositions of any of the embodiments 12-23.

The invention claimed is:

1. A printing system comprising:
a. an object holder configured to hold an object;
b. a device for providing photopolymer material on the object holder or the object;
c. an exposure system for illuminating the photopolymer material; and
d. an actuator for moving the exposure system relative to the object holder in a scanning direction,
wherein the exposure system comprises an array of light sources to expose the photopolymer material to radiation with a first wavelength, wherein the array extends in the scanning direction and a width direction perpendicular to the scanning direction, and wherein light sources at least partially overlap with at least two other light sources seen in the width direction, and wherein the array of light sources is formed by multiple assemblies, each assembly comprising multiple rows of light sources extending in the width direction.

2. The printing system according to claim 1, wherein the light sources are micro LEDs including micro mirrors to direct light from the LEDs to the photopolymer material.

3. The printing system according to claim 1, wherein the assemblies are overlapping.

4. The printing system according to claim 1, wherein the printing system comprises a light intensity sensor system arranged to measure the light intensity and/or the position of the individual light source images, and wherein the measured light intensities and/or positions of the individual light source images are used to tune power of the light sources individually.

5. The printing system according to claim 4, wherein the measured light intensities of the individual light sources are used to mechanically adjust the position of the arrays of light sources relative to each other.

6. The printing system according to claim 1, wherein the light sources are arranged in rows and columns extending perpendicular to each other, and wherein the rows extend in a direction making an acute angle with the width direction.

7. The printing system according to claim 1, wherein the light sources are arranged in rows extending parallel to the width direction, and wherein a smallest distance between rows seen in the width direction is smaller than a dimension of the light sources seen in the width direction.

8. The printing system according to claim 7, wherein the smallest distance between rows seen in the width direction is below 25% of the dimension of the light sources seen in the width direction.

9. The printing system according to claim 7, wherein the number of rows is larger than N, with N being a positive integer determined by the rounded up ratio between a transverse pitch of the light sources in a row and the smallest distance between rows.

10. The printing system according to claim 1, wherein the light sources at least partially overlap with at least four other light sources seen in the width direction.

11. The printing system according to claim 1, wherein the light sources are LEDs.

12. The printing system according to claim 1, wherein the light sources are tunable with respect to a light intensity emitted by the light sources, and wherein the light sources are configured to provide an increased light intensity at the moment of turning the light sources on and/or at the moment of turning the light sources off.

13. The printing system according to claim 1, wherein the light sources are tunable with respect to a light intensity emitted by the light sources, and wherein the light sources are configured to provide an increased light intensity when the light sources contributes to the curing of an edge of an object to be cured.

14. A printing system comprising:
a. an object holder configured to hold an object;
b. a device for providing photopolymer material on the object holder or the object;
c. an exposure system for illuminating the photopolymer material; and
d. an actuator for moving the exposure system relative to the object holder in a scanning direction,
wherein the exposure system comprises an array of light sources to expose the photopolymer material to radiation with a first wavelength, wherein the array extends in the scanning direction and a width direction perpendicular to the scanning direction, and wherein light sources at least partially overlap with at least two other light sources seen in the width direction, and wherein the light sources are tunable with respect to a light intensity emitted by the light sources, and wherein the light sources are configured to provide an increased light intensity at the moment of turning the light sources on and/or at the moment of turning the light sources off.

15. A printing system comprising:
a. an object holder configured to hold an object;
b. a device for providing photopolymer material on the object holder or the object;
c. an exposure system for illuminating the photopolymer material; and
d. an actuator for moving the exposure system relative to the object holder in a scanning direction, wherein the exposure system comprises an array of light sources to expose the photopolymer material to radiation with a first wavelength, wherein the array extends in the scanning direction and a width direction perpendicular to the scanning direction, and wherein light sources at least partially overlap with at least two other light sources seen in the width direction, and wherein the light sources are micro LEDs including micro mirrors to direct light from the LEDs to the photopolymer material.

16. The printing method using a printing system as claimed in claim 1, comprising the step of tuning the light sources with respect to a light intensity emitted by the light sources, wherein the light sources are configured to provide an increased light intensity at the moment of turning the light sources on and/or at the moment of turning the light sources off, and/or wherein the light sources are configured to provide an increased light intensity when the light sources contribute to the curing of an edge of an object to be cured.

17. The printing system according to claim 8, wherein the smallest distance between rows seen in the width direction is at most 5 μm.

18. The printing system according to claim 9, wherein the number of rows above N is at least the rounded up value of $N*ds*\sin(\alpha)/SH$, where ds is a scanning pitch between adjacent rows in the scanning direction, where $\alpha$ is a predetermined maximum rotational error angle after assembly, and where SH is the smallest distance between rows.

19. The printing system according to claim 11, wherein the light sources are micro LEDs.

* * * * *